(12) United States Patent
Pawelski et al.

(10) Patent No.: US 11,634,241 B1
(45) Date of Patent: Apr. 25, 2023

(54) SPACE FOUNDRY

(71) Applicant: CisLunar Industries USA, Inc., Denver, CO (US)

(72) Inventors: Joseph W. Pawelski, Fort Collins, CO (US); Toby Joseph Daniel Mould, South Croydon (GB); Jan Walter Schroeder, Sötern (DE); Gary Douglas Calnan, Denver, CO (US)

(73) Assignee: CisLunar Industries USA, Inc., Denver, CO (US)

( * ) Notice: Subject to any disclaimer, the term of this patent is extended or adjusted under 35 U.S.C. 154(b) by 91 days.

(21) Appl. No.: 17/737,588

(22) Filed: May 5, 2022

Related U.S. Application Data

(60) Provisional application No. 63/184,683, filed on May 5, 2021.

(51) Int. Cl.
  *B64G 4/00* (2006.01)
  *F27D 3/14* (2006.01)
  *B64G 1/10* (2006.01)
  *F27D 3/00* (2006.01)

(52) U.S. Cl.
  CPC ............. *B64G 4/00* (2013.01); *B64G 1/1078* (2013.01); *F27D 3/14* (2013.01); *F27D 2003/0039* (2013.01); *F27D 2003/0054* (2013.01)

(58) Field of Classification Search
  CPC ............... F27D 3/14; F27D 2003/0039; F27D 2003/0054; B33Y 30/00
  See application file for complete search history.

(56) References Cited

U.S. PATENT DOCUMENTS

| | | | |
|---|---|---|---|
| 10,401,832 B2 | 9/2019 | Snyder et al. | |
| 2016/0361763 A1* | 12/2016 | Batchelder | B21C 23/00 |
| 2017/0087632 A1* | 3/2017 | Mark | B22D 11/01 |
| 2021/0046541 A1* | 2/2021 | Sukhotskiy | B33Y 30/00 |
| 2021/0323053 A1* | 10/2021 | Gibson | B33Y 40/00 |

OTHER PUBLICATIONS

Maidana, Carlos & Nieminen, Juha. Multiphysics Analysis of Liquid Metal Annular Linear Induction Pumps: A Project Overview. Feb. 2016 [retrieved on May 2, 2022], Retrieved from the Internet:<URL:https://www.osti.gov/servlets/purl/1256457>.

* cited by examiner

*Primary Examiner* — Scott R Kastler
(74) *Attorney, Agent, or Firm* — Wiedmann Law LLC

(57) ABSTRACT

Certain embodiments of the inventive technology may be described as apparatus for melting and reshaping metal from a first shape into a second shape in a microgravity or zero gravity environment, such as a space foundry, where such apparatus includes feedstock input componentry (5) configured to accept conductive metal feedstock (7) having the first shape, a furnace and a furnace pre-stage (22) established upflow of the furnace, a plurality of electromagnetic field generators (10), each of which is configured to generate an electromagnetic field, to, e.g., steer, melt and/or move the metal, whether melt or otherwise, and casting componentry (15) configured to reshape molten metal to the second shape. Certain embodiments may achieve a high degree of control over electromagnetic fields by offering individual adjustment of one or more electrical parameters of the electromagnetic field generators (10).

32 Claims, 8 Drawing Sheets

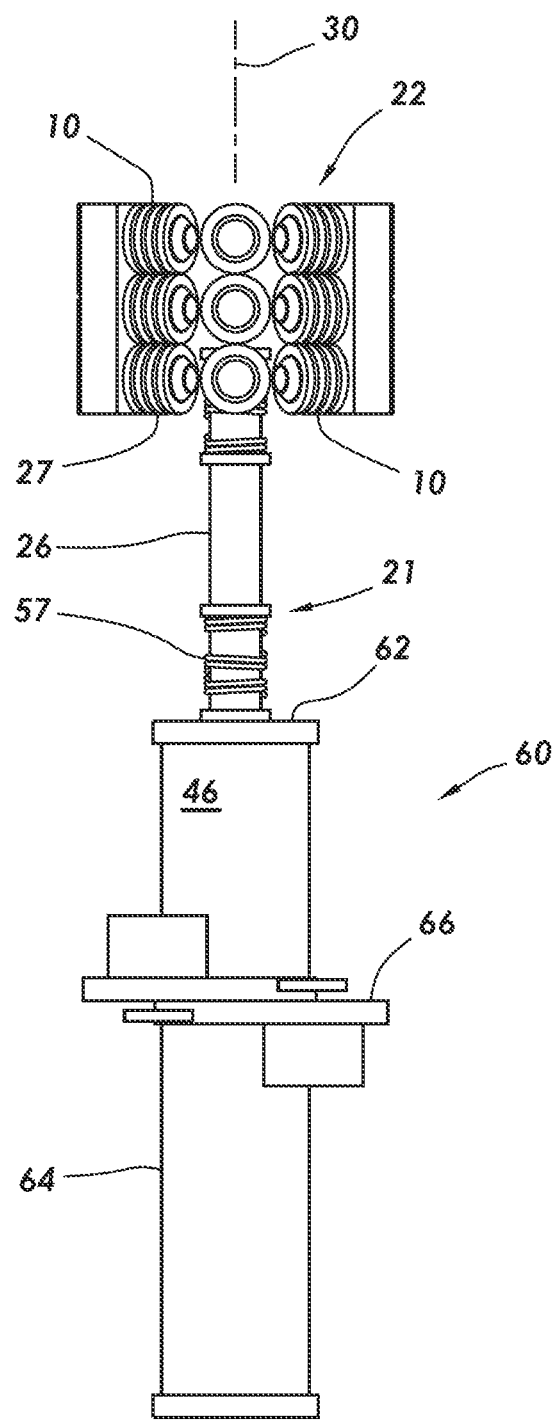 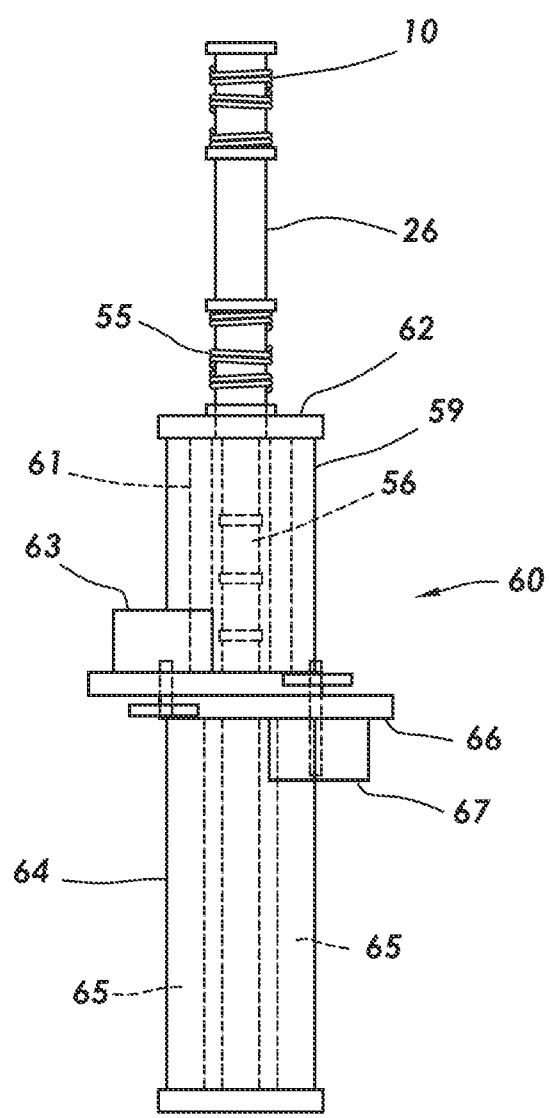
FIG. 4A
FIG. 4B

SPACE FOUNDRY

CROSS-REFERENCE TO RELATED APPLICATIONS

This US Non-Provisional patent application claims benefit of and priority to U.S. Provisional Application No. 63/184,683, filed May 5, 2021, said provisional application hereby incorporated herein in its entirety.

STATEMENT REGARDING FEDERALLY SPONSORED RESEARCH OR DEVELOPMENT

This invention was made with government support under Contract No. 80NSSC21C0149 awarded by the National Aeronautics and Space Administration. The government has certain rights in the invention.

BACKGROUND

Thousands of pieces of metal space debris orbit the earth and perhaps other orbs (e.g., the moon) in the solar system, posing risk of catastrophic collision with functioning craft such as satellites, and possibly also negatively affecting the earth environment. Embodiments of the inventive technology disclosed herein may provide apparatus and methods useful in reducing the amount of space debris, whether by re-purposing it, assisting in its relocation, recycling it, assisting in burning it up in earth's atmosphere, etc. Additional purposes, functions, and advantages may exist, some or all of which may be disclosed or alluded to elsewhere in this application.

BRIEF SUMMARY OF THE INVENTION

Certain embodiments of the inventive apparatus may be described as a metal space debris processor (that processes metal space debris), e.g. a space foundry, operable in an environment with acceleration due to gravity that is other than 9.8 m/sec$^2$, to extra-terrestrially melt and reshape solid metal (e.g., harvested from space debris) from a first shape into a (solid) second shape (e.g., different cross-sections, or even merely different lengths). The apparatus may be brought to the space debris (e.g., perhaps hosted on a space craft, including but not limited to a space station) and/or debris may be brought to the apparatus (e.g., when the apparatus is on a craft, or on surface of, e.g., the moon, perhaps in a building thereon). In any of such embodiments, the apparatus may be a mobile unit and seek to, inter alia, process metal space debris (e.g., space junk) by converting it into a different shape for, e.g., use as propellant fuel, for descent so it may burn up in an atmosphere (e.g., earth's), etc. Such shape transformation may, at times, be incidental to a primary purpose of, e.g., recycling, metal refinement, alloy generation, etc. time to process a portion of a strip of metal feedstock from entry into the apparatus to completion of casting may be, e.g., from 2 mins. to 2 hours, although such is merely exemplary, and many other possible times and ranges are possible.

BRIEF DESCRIPTION OF THE SEVERAL VIEWS OF THE DRAWINGS

FIG. 4A shows a side view of an embodiment of the inventive technology, showing furnace pre-stage, furnace and casting componentry, with furnace pre-stage shown via (length-wise) cross-sectional cutaway. FIG. 4B shows a side view of an embodiment of the inventive technology, showing furnace and casting componentry.

DETAILED DESCRIPTION OF THE INVENTION

Figure 1B:
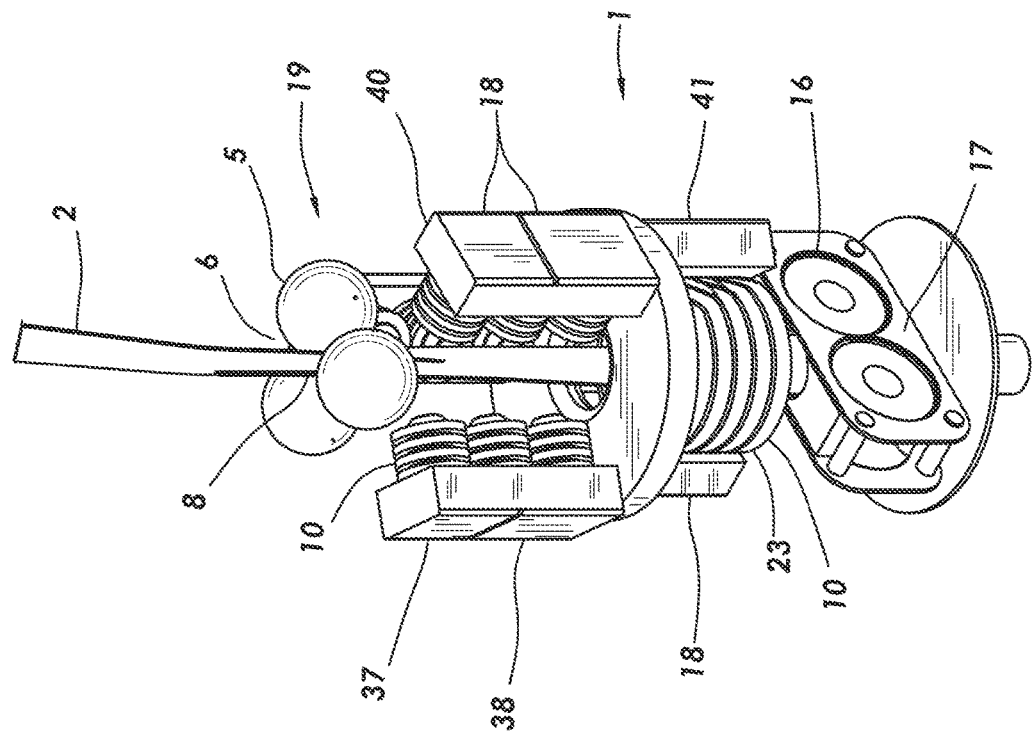
FIG. 1B shows a perspective view of an embodiment of the inventive technology, without housing (showing mechanical feedstock input componentry, furnace pre-stage (with EMF generators in triangle configuration), furnace, and casting componentry).

The present invention may manifest in several embodiments and may exhibit different inventive facets. The description provided herein, while sufficiently enabling, may only explicitly describe certain of the several embodiments. Elements of the invention described herein can potentially be combined in various ways to create additional embodiments not explicitly described herein. Embodiments described herein may be exemplary only; they should not be read to limit the scope of the invention. Additionally, it should be understood that this application describes not only the multi-element/componentry apparatus and methods explicitly described, but also those involving any of the possible various combinations and permutations of such elements/componentry, and indeed perhaps even one element/componentry alone.

Embodiments of the inventive apparatus (1) may be particularly configured to operate in environments where acceleration due to gravity (which includes planetary and artificial gravity) is other than 9.8 m/sec$^2$, e.g., in certain space environments where there is zero gravity, microgravity, low gravity (lower than 20% less than 9.8 m/sec$^2$), or hyper-gravity (greater than 20% more than 9.8 m/sec$^2$). Hyper-gravity as used herein is not what is achieved by terrestrial (i.e., on earth) centrifugal or spin casting (which has two components of force, one of which is earth gravity). Embodiments may even be configured to operate on planet(s) (other than earth), and certainly in micro- or zero gravity (e.g., where micro- and zero gravity are not planetary or near-planetary gravity, and not centrifugal or spin casted). As mentioned, gravity as used herein includes not only mass-effected gravity (e.g., as effected by a planet), but also artificial gravity induced by centrifugation (e.g., as in centrifugal or spin casting in space). Certain embodiments may be operable over a range of accelerations (e.g., gravity gradient) as may be found in, e.g., centrifugal/spin casting applications (e.g., spacecraft or spinning foundries) in space, even where within such range is 9.8 m/sec$^2$ (in addition to perhaps low or hypergravity). Typically, a specific embodiment that is configured to operate in, e.g., micro- or zero gravity, would not operate in environments with a significantly different acceleration field (e.g., hypergravity). Note that certain other embodiments may be configured to operate at 9.8 m/sec$^2$, whether on earth or not.

Certain embodiments configured to operate in lower (than earth) or no gravity embodiments may need to provide any control (e.g., stabilizing, motion control, centering, aligning, steering, melt agglomerization) that might otherwise be provided, at least in part, by gravity. Note that in certain embodiments, one or more sites (e.g., input site, melt site, casting site) may be in vacuum during at least part of the operation of the apparatus, whether because the ambient environment is in vacuum (space is considered in vacuum because it is devoid of matter, or nearly so) or otherwise, but such is not a requirement. Indeed, unless indicated otherwise, any features, functionality, components, etc. indicated herein are not necessarily required in the inventive technology.

The term metal (2) includes any substance that is predominantly or all metal, and can be in any phase (e.g., melt (12), solid, perhaps even gaseous). A melt can be one or more discrete, separate melted metal masses (e.g., a plurality of relatively small, perhaps roughly spheroid shaped "droplets" of melted metal in the same general vicinity may be referred to as a melt (12) even though they may be disconnected from one another). Of course, a larger contiguous melted mass, perhaps as the result of agglomeration of droplets, may also be referred to as a melt (12). Surface tension forces, which act on the melt at all times, tend to make the melt form a sphere; EMF's (electromagnetic fields (11)) acting on the melt can cause that sphere to distort, e.g., into a football or other shape, depending on the EMF's. Metal feedstock (7) may be conductive (electrically conductive). Electrically conductive metals that may act as feedstock may include, but are not necessarily limited to: Al (aluminum), steel, Ti, copper, silver, etc., alloys containing any one or more thereof.

In that the apparatus may be fairly characterized as effecting a flow of metal—from its entrance as solid feedstock to its final reshaping into a second shape (4), and possible removal from the apparatus—certain componentry and/or processes may be said to be upflow or downflow of other componentry and/or processes. In certain embodiments, for example, a melt site (14) may be said to be upflow of a casting site (17). Relatedly, certain embodiments may be said to be configured for one-way processing of spent space debris (and perhaps even continuous processing in that metal feedstock (7) may be input while casting of previously input metal occurs). Note that a casting process as featured in certain embodiments may be described as a continuous casting process in that, as opposed to a molding process, it may involve continuous (over a period of time) "rolling out" of casted metal (of a second shape), such as wire, through a moving die (48).

Generally, in at least one embodiment of the inventive technology, feedstock input componentry (5) of the apparatus may be configured to accept metal feedstock (7) (e.g., solid metal, perhaps in strips that may have been harvested from, e.g., orbiting space debris) having a first shape (3) (e.g., as given to it, at least in part, by a cutting operation of a harvester) into the apparatus at a metal input site (8) from outside of the apparatus; metal may then be moved through the input site, to, e.g., the melt site 14 (e.g., to where melting starts, e.g., the most upflow edge of the melt site), through that melt site, and to the casting site (17) (and perhaps through that casting site, depending on, e.g., the type of casting, whether casted metal is removed from the apparatus, and if so, how such removal occurs). That first shape may, but need not, be non-uniform in cross-section and/or length. The apparatus generally may have componentry (e.g., motive force generator(s) such as electromagnetic field (EMF) generator(s) (10)) that acts to move metal into, through and/or out of the system; such may be referred to as a motive force generator(s). Such motive generator(s) may achieve substantially only a certain movement of the metal, or they may achieve other functions as well (e.g., EMF generators of a furnace pre-stage (22) may, in certain embodiments act to not only move conductive feedstock into the apparatus (and thus act as an input motive force generator (19)), but may also act to center the melt (12) in the heater (9)). Generally, the apparatus includes electromagnetic field generator(s) (10), each of which is said to generate an electromagnetic field (11), each of such field(s) playing a role in one or more of, e.g., moving metal, steering metal, heating metal, melting metal, casting metal, etc.

It is of further note that any componentry indicated herein can be a single component or a system of components (where a component itself can have one or many part(s)); and it is not necessary that componentry be contained within a certain area or as a contained assembly (as indeed different components of "multi-component" componentry can be in several different locations on the apparatus).

The term "motion", "move," or variant forms thereof, should, unless indicated otherwise, be understood as relative motion (where, if, e.g., metal is moved into a mold (46), then either the metal is moved relative to the "stationary" mold (even though the mold still might be moving through space, e.g., in orbit) and/or or the mold may be moved relative to the "stationary" metal. Note that whether a component is considered stationary may be determined by whether it is moving relative to, e.g., the housing of the apparatus or the heater (9) of the apparatus.

Figure 6A:
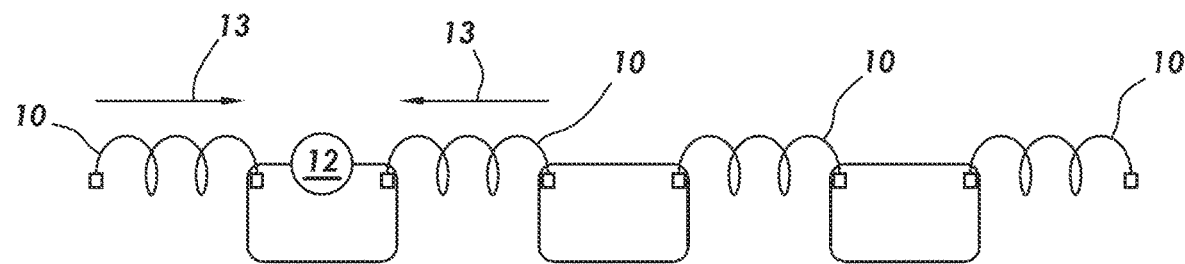
FIGS. 6A-6D, at least conceptually, shows simple protocol by which a left-to-right motive force can be generated via control of coils individually, in at least one embodiment of the inventive technology.
Figure 6B:
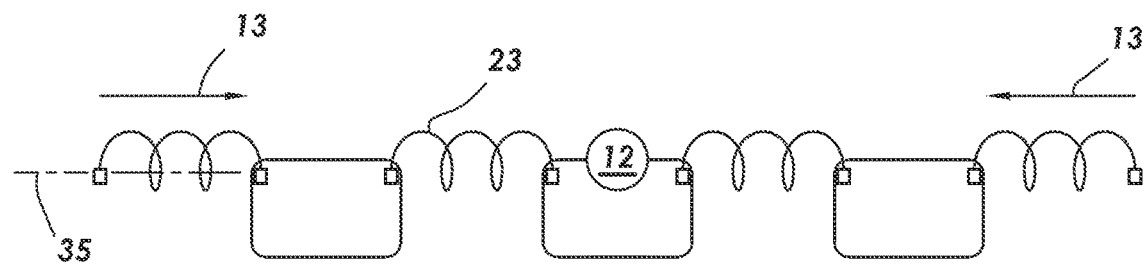
Figure 6C:
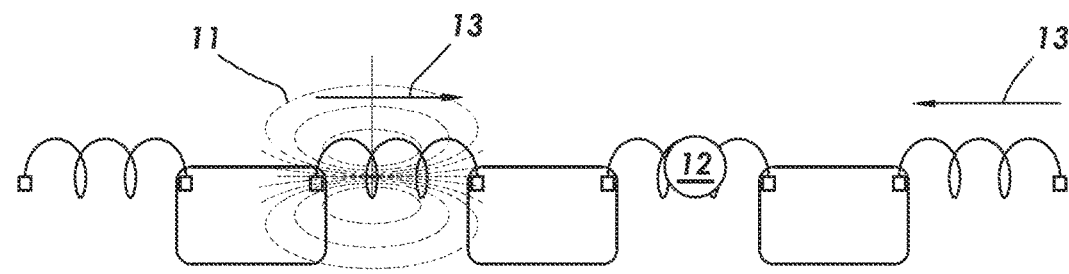
Figure 6D:
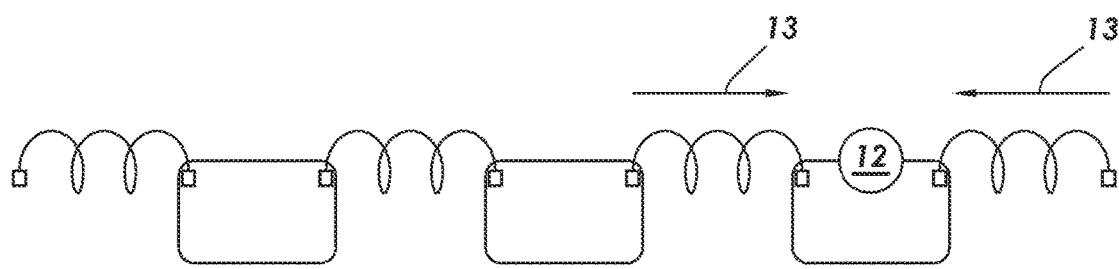

FIGS. 6A-6D show what may be referred to as solid state transfer (each figure showing a different snapshot in time) of material (metal, typically melt (12)), to achieve the holding and/or movement of the metal as intended, as may appear in embodiment(s) of the inventive technology. Such could possibly represent any electromagnetic field (EMF) induced motion as seen in any of the various embodiments of the inventive technology, whether such motion is needed to feed, melt, cast, mix, agglomerate (accumulate), steer, process generally and/or remove metal (from the apparatus), etc. FIGS. 6A-6D show a simple coil configuration that shows an elementary control scheme (selective energization and de-energization of EMF generators (10)) that could move a melt (12) from left to right. Note that such configuration and scheme could roughly indicate what could be used in the furnace pre-stage (22) of, e.g., FIGS. 1B, 2B, 3A, 3B and 4A, where each layer of three inwardly pointing flux concentrated coils could, in a very simple application, be analogized to a single coil in FIGS. 6A-6D. Selective energization of coil(s) as revealed via a comparison of the various FIGS. 6A-6D with each other (arrows represent energization and force direction), can create a motive force (left to right in FIGS. 6A-6D) to move the metal as desired. Indeed, individual control of different coils (23), e.g., energization (on or off), frequency and/or amplitude of the power of a EMF generator (e.g., a coil), could create a custom control scheme, which offers significant advantages over stepper and typical AC motors (the most well known application of electromagnetic induction fields being used for motive force). FIG. 6C shows schematically an EMF, generated by one of its EMF generators.

The motion achieved by material transfer generally represented by FIGS. 6A-6D may be characterized as purely electromagnetic. Note that, while a melt (12) could indeed be moved along the longitudinal axes of various coils as shown, the figure is also intended to merely represent how EMF's could generally be used to move a melt (12) (and as such, the figure is intended to show how EMF generators could be arranged in different configurations with respect to the direction of motion of the melt, to move the melt). For example, coils could be oriented, perhaps in tiered configuration (as shown in the furnace pre-stage (22) of, e.g., FIG. 1B), such that the melt (12) does not move along the (longitudinal) axes of the coils (35) (while still moving along the axis of the heater (9)). In the simple schematic of FIGS. 6A-6D, control over energization of EMF generators (e.g., coils) alone, could achieve movement of a melt (12) as desired.

Note that a variety of control schemes can be used to control the movement of the melt (12) through such system (as generally shown by FIGS. 6A-6D). More particularly, while certain applications may require only a constant speed through the EMF generators (10) (which may be achieved by a "uniform" 3 phase alternating power of the EMF generators, and perhaps selective energization of those EMF generators), others may benefit from control that achieves, as but a few examples, variations in speed of the melt (12) (e.g., a decrease or increase in its speed at any point, including even stopping it at any point), changes in acceleration of the melt, changes in steering of the melt, and/or changes in shape of the melt, etc. Such control may be achieved via individual control over, e.g., energization (e.g., whether the EMF generator is powered on or not), frequency and/or amplitude of one or more of the EMF generators (where individual control implies the ability to control any of such independently (i.e., without affecting the same parameter of any other EMF generators)). For example, in those applications where there is phasing between one or more EMF generators, instead of 120° phasing among the EMF generators (which certainly may be used), EMF generators could be phased differently, such that at least some of the peaks are offset by other than 120°. Control can be achieved via dynamic changes, e.g., where amplitude, frequency and/or energization (e.g., whether an EMF generator is powered on or off) can be adjusted so at one point in time such is/are different from what they are at a different point in time. Such differential phasing may be achieved by variation of frequency.

Note that control schemes may consider the effect of certain frequencies to hold a melt (12) in position, or move that melt, without heating, while others heat (while possibly also holding a melt in position or moving it). An additional control aspect may be achieved via changing amplitude. Either or both of such frequency, amplitude, and energization (power on or off) control, perhaps even of EMF generator(s) individually, can be changed to achieve motion generally, speed, acceleration, position, rate of heating, degree of heating, location of motive force, location of heat application to melt, and/or possibly even shape of the melt as desired, or changes in any of same. While certain embodiments may exhibit control achieved via, e.g., adjustment of amplitude and/or frequency of the entire EMF generator array (e.g., without individual EMF generator (e.g., coil) control), individual control of coils can result in even greater control. For example, two immediately neighboring coils (e.g., possibly one immediately downflow of another) could have different amplitudes, and be relatively phased to a degree that is different from relative phasing of other coils. Any control can be in response to sensor output, including but not limited to vision sensor, EM sensor, etc. Note that certain disclosure appearing in Szekely, J; Schwartz, E; Hyers, R; "Electromagnetic Levitation—A Useful tool in Microgravity Research" JOM, vol. 47, 35 no. 5, pp. 50-53, (1995), hereby incorporated herein in its entirety, may, in certain embodiments, find application in certain embodiments of the inventive technology with respect to certain componentry.

Figure 7A:
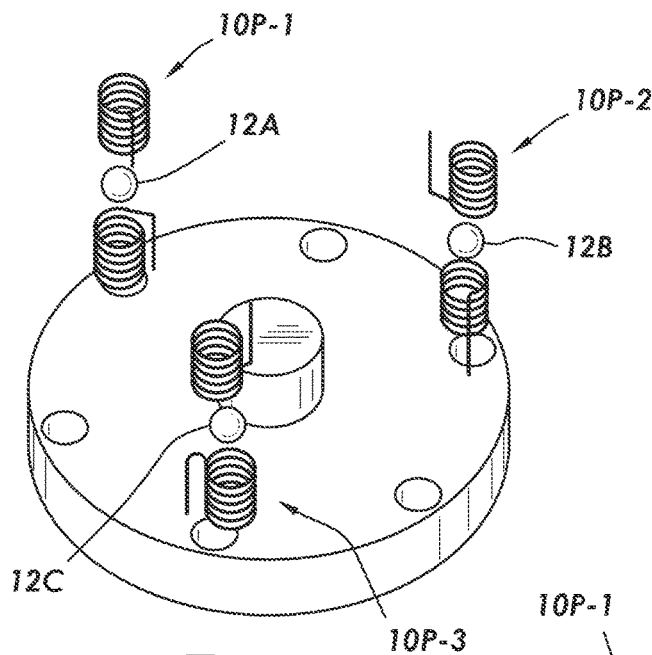
FIGS. 7A-7C show snapshots in time of a rotary disc based electromagnetic mechanical hybrid metal movement system as may appear in embodiments of the inventive technology.
Figure 7B:
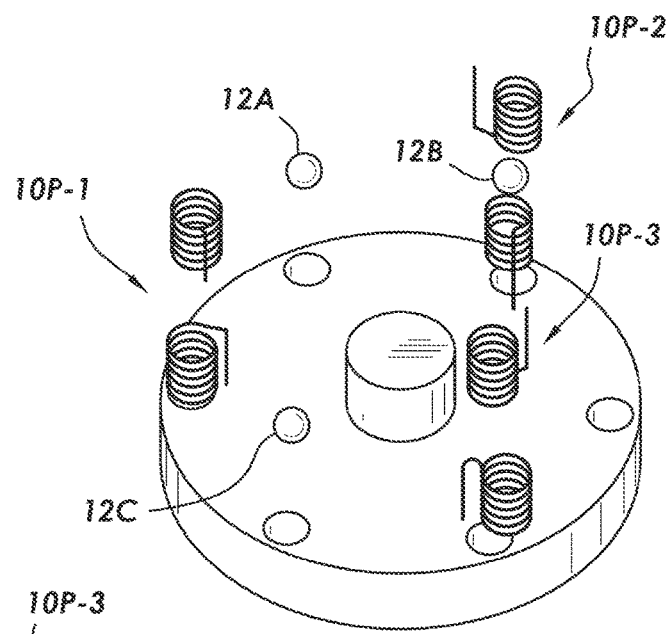
Figure 7C:
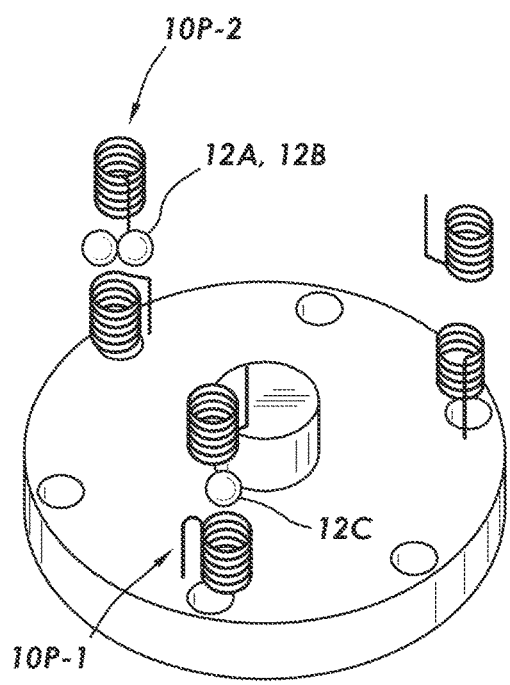
Figure 8A:
FIG. 8A shows an exemplary cross-section of conductive metal feedstock that may be input and processed by embodiments of the inventive technology.

FIGS. 7A-7C shows an exemplary process of a hybrid material transfer system achieved via EMF generators (10) (e.g., induction coils) and (mechanical) rotational movement componentry (it may be referred to, e.g., as a polar mechanism, perhaps featuring a disc-type base). In certain embodiments, a plurality of coils (e.g., pairs of induction coils labeled as 10P-2, 10P-2 and 10P-3) may be arranged in series along the perimeter of a disc and may transfer materials (labeled as melts 12A, 12B and 12C) between coils (each within pairs of coils 10P-1, 10P-2 and 10P-3, respectively) when the induction current of a coil pair is turned off and the disc rotated (note that, in certain embodiments, each coil of a coil pair can be controlled individually, without impacting parameters of the other coil of that pair, or indeed of any other coils). In micro- or zero gravity, upon de-energization of pairs 10P-1 and 10P-3, and rotation of the disc, the melts (e.g., 12A and 12C in FIGS. 8A-C) stays in place, and the respective de-energized coil pairs (10P-1 and 10P-3 in FIGS. 8A-C) moves away from the melts, and a neighboring coil (10P-2, with melt 12B between it, and 10P-1 in FIGS. 8A-C) moves to the stationary melts (10P-2 moves to former position of coil pair 10P-1, and 10P1 moves to former position of 10P-3 in FIGS. 8A-C). This is an example of relative motion, and is one way melts may be combined, even mixed (see melts 12A and 12B of FIG. 7C). Embodiments using such rotary metal movement system may still define a flow, and may be a substitute for at least part of the more linear metal movement componentry shown in, e.g., FIGS. 6A-6D. Metal may be moved into and out of the rotary system (e.g., from input componentry and/or to casting componentry (15)) via, e.g., EMF generator(s) (10)

that form part of the rotary system or otherwise. More specifically with respect to in FIGS. 7A-C:

FIG. 7A shows an embodiment of the disc-based rotational metal movement system and shows the "holding" of three melts 12A, 12B and 12C between EMF generators (10) of three different pairs of EMF generators (10) (10P-1, 10P-2 and 10P-3), e.g., coil pairs.

FIG. 7B shows an intermediate positioning of a protocol that de-energizes coil pairs 10P-1 and 10P-3 to direct the field to melts that have been abandoned by their previously energized respective coil pairs.

FIGS. 7A-C is one example of how mechanical and EMF systems may exploit micro- or zero-gravity environments: focusing on melt 12A alone, it is left relatively motionless in space while melt 12B is retained by EMF's of coil pair 10P-2 and mechanically moved relative to motionless melt 12A, resulting in melts 12A and 12B within coil 10P-2.

In certain embodiments, at least one EMF generator (10) may create all the motive force that moves the metal into, through, and even perhaps out of, the apparatus (i.e., at all points in the apparatus where metal motion is required for operation); in others, there may be other componentry, e.g., mechanical componentry, that acts to supply, in whole or in part, any of such motive force(s). In certain embodiments, mechanical motive force generator(s) (e.g., with wheels, treads, spheres, moving surfaces that may or may not contact the metal, etc.) may act either alone or in conjunction with at least one electromagnetic field generator (10) to generate all motive force needed to move metal into, through and perhaps even out of the apparatus. As such, there may be several different configuration options to move metal as proper functioning of the inventive technology may require. For example, in at least one embodiment, a mechanical system (e.g., moving surfaces such as rolling (e.g., perhaps by a motor) spheres arranged in a triangle (see FIG. 1B), as but one possible shape, to perhaps contact and move solid metal into the apparatus) may be part of feedstock input componentry (5) to generate at least part of the motive force necessary to move conductive metal feedstock (7) from outside of the apparatus to inside of the apparatus.

At least one electromagnetic field generator (10) of a furnace pre-stage (22) may assist in providing input motive force, and may even provide at least part of a motive force that moves metal through a melt site, to the casting site, at which point mechanical componentry (a mechanical casting process motive force generator (50)) may play a role in moving a melt (12) into and through the cast(s). It is of note that any motion-field generated by an EMF generator may be, e.g., a sinusoidal or other time-variant (e.g. alternating) three-dimensional magnetic dipole or multipole field, perhaps configured to enable the motion of the conductive object through the apparatus and through the electromagnetic die).

Note that where more than one system is responsible for moving metal into and through the apparatus, there may be a degree of overlap where one system "hands off" the metal to the next componentry that is downflow of it. Indeed, there may be a degree of overlap among the various sites indicated herein; it is not necessarily the case that delineations between, e.g., input site, melt site, and casting site, are strict/clear (see, e.g., Fi-8C FIG. 8C). Certain sites, in certain embodiments, might not even abut against neighboring sites (e.g., the metal input site (8), e.g., an aperture defined by feedstock input componentry (5), might not abut against the site that is closest to it (e.g., the melt site (14) that is downflow of it).

Relatedly, one motive force generator (whether, e.g., mechanical and/or electromagnetic) may indeed play a role, perhaps even an equal role, in moving the metal at any point in the flowpath (through the apparatus) where the motive force is indicated as caused by a different motive force generator. This may be due to, e.g., the overlap of EMF's. Further, it is not the case that every system that generates a motive force is exclusively a motive force generator, as indeed any system can have more than one function (e.g., the electromagnetic field generator (10), which melts metal, can also, in certain embodiments, act as a motive force generator, such that it heats the metal sufficiently to melt it and keep it melted and to moves the melt (12)).

Any specific named componentry may act to contribute, in perhaps even significant degree, to the achievement of a function that is indicated as being achieved by different componentry (perhaps such indication made by the name of such different componentry); this may even be observed where such function is not even suggested by the name of such specific named componentry. For example, in certain embodiments, EMF generator(s) in the furnace pre-stage (22) may act as feedstock input componentry (5) (e.g., as an input motive force generator (19)) even where a mechanical input motive force generator (19) is provided upflow of the furnace pre-stage. EMF generator(s) (10) of the furnace pre-stage (22) not only, e.g., keep the melt (12) in the furnace, but also assist in providing the input motive force (20).

When one named componentry acts to assist, in significant manner, in the achievement of a function that is also achieved by different componentry, the two may be said to be integrated with each other. Note that in certain embodiments, components (perhaps assembled) that act as one named componentry can also act as the entirety of different componentry (and such apparatus is still fairly described as still including both such componentry). An example of such may be where, as in FIG. 3A, the moving die acts as a cast and as a casting process motive force generator. Or as in FIG. 2B where EMF generators (10) of the furnace pre-stage acts to provide all of the input motive force, and thus alone also acts as the input force generator, while also acting in such (and perhaps other) embodiments, as a heat generator (to melt the solid feedstock) and or melt motive force generator. Note that where, e.g., an EMF generator (10) provides a not-insignificant portion of an entire motive force (e.g., a force that moves metal through a melt site), e.g., more than 10% of the total such force, it may be characterized as providing that force (just as each of four rowers of a boat may be said to provide a boat propulsion force).

An EMF generator (10) (which may be a motion field generator) may generate a motive force on the conductive metal (solid or liquid (melt)) and/or melt it by the interaction of a time-variant EM field generated by the EMF generator (10) (as caused by time-variant powering of such coil), and the time-variant EMF induced thereby in the conductive metal. In certain embodiments, one or more of the EMF generator(s) (10) may (perhaps in addition to playing a role in other movement) move the melt (12) (via melt motive force (13)) from the portion of the melt site where melting starts to take place, through the melt site, to the most upflow edge portion of the casting site. Note that generating a melt (12) (or simply melting) can include not only phase change from solid to molten (liquid), but also maintenance of a melt; indeed, the melt site can include any area in the apparatus, such as in the heater (9) (e.g., the furnace (21) alone, or furnace (21) and any furnace pre-stage (22) that may be provided), or even in a part of the casting site (17) at times where it is desired to maintain a melt (e.g., particularly just upflow of the casting componentry (15) in certain embodiments).

Note that certain embodiments may feature at least one electromagnetic field that melts conductive metal feedstock to generate a melt at a melt site, and at least one electromagnetic field that provides at least a portion of a melt motive force that moves the metal through the melt site. Such may be seen where, at least one of all of the EMF's that melt also provides some degree of motive force; at least one of all of the EMF's that move metal also assists in melting; and even where none of the EMF's that melt play a role in moving.

In particular embodiments, there may be feedstock input componentry (5) established substantially at an upflow end (6) of the apparatus and configured to accept conductive metal feedstock (7) having the first shape into the apparatus at a metal input site (8). The feedstock input componentry (5) may generally include all componentry (other than power electronics) of the apparatus that plays a role in inputting feedstock into the apparatus; it may include an input motive force generator (19) (e.g., powered wheels, or treads and/or EMF generator (10), as but a few examples), that generates the input motive force that moves the conductive metal feedstock (7), whether it be one piece (e.g., strip or ribbon) or more than one piece at a time, from outside of the apparatus to into the apparatus at the metal input site (8). As with any motive force generator, it can be mechanical (as with the three driven rotating roller ball (74) design shown in FIG. 3A), electromagnetic, or a combination thereof. In embodiments where the motive force generator is or includes an EMF generator (10), such generator may be established as part of the heater (9) and/or upflow of it.

In yet other embodiments, it maybe that an input motive force generator that supplies the entirety of the input motive force is supplied by a discrete apparatus that interfaces (e.g., operatively connects) with the inventive apparatus at its upflow end (6), such as, but not limited to, a metal harvester that perhaps robotically feeds solid metal into the inventive apparatus from outside of it. Note that certain embodiments may present the option of more than one type of motive force generator, as different such generators may be operatively connected as part of the apparatus at its upflow end (6), and indeed switched out as desired (indeed, such removability and replaceability feature may also be found with respect to casting componentry (15) towards the most downflow end of the apparatus).

In several of the various embodiments of the inventive technology, the feedstock input componentry (5) is configured to accept solid metal feedstock (7). That feedstock, perhaps harvested by a different apparatus (that may possibly interface with the inventive apparatus disclosed herein, perhaps even acting to provide the input motive force for such feedstock), may reconfigure space debris (e.g., by cutting it) into strips (e.g., ribbon-like strips (ribbon) having a first shape, e.g., longer than 0.375" (merely illustrative), and perhaps have cross-sectional dimensions of at least 0.04"×0.375" and minimum lengths of 0.375" (as but one possible range of dimensions)), whether such cross-sectional shape be polygonal, curved at least in part, circular, elliptical, square, rectangular, irregular, wide and thin, as but a few of perhaps innumerable shapes. Such strips (regardless of the exact size, but generally longer than they are wide) may be viewed as different from chips of metal, and certain embodiments of the inventive technology may be described as having feedstock input componentry (5) particularly configured to accept metal strip feedstock into the apparatus (including perhaps providing a force that moves such strips into the apparatus, e.g., with motor driven roller balls (74), as but one example); multi-coil input motive force generator configurations may provide geometries optimized for driving a metal object (e.g., metal strip) along a longitudinal axis defined by the apparatus (e.g., a heater axis). Such may be different from input componentry that can input only, e.g., chips, which might present processing issues such as melting difficulty that strips might not exhibit (because, e.g., strips have a lower surface area to volume ratio and therefore lower surface Al oxide-related difficulty in melting); chips also may be harder to capture/contain. Certain disclosure of the aforementioned Szekely el al. reference may be particularly applicable here. Particular embodiments may be generally configured to accept and move strip feedstock into the apparatus, perhaps more than one strip (e.g., ribbon) side-by-side at a time. Ribbon feedstock has been found, in several applications, to be an exceptionally workable format due to heat transfer considerations, at least in part because the ribbon "format" may assist with melting and separation of oxide/dross.

Figure 1A:
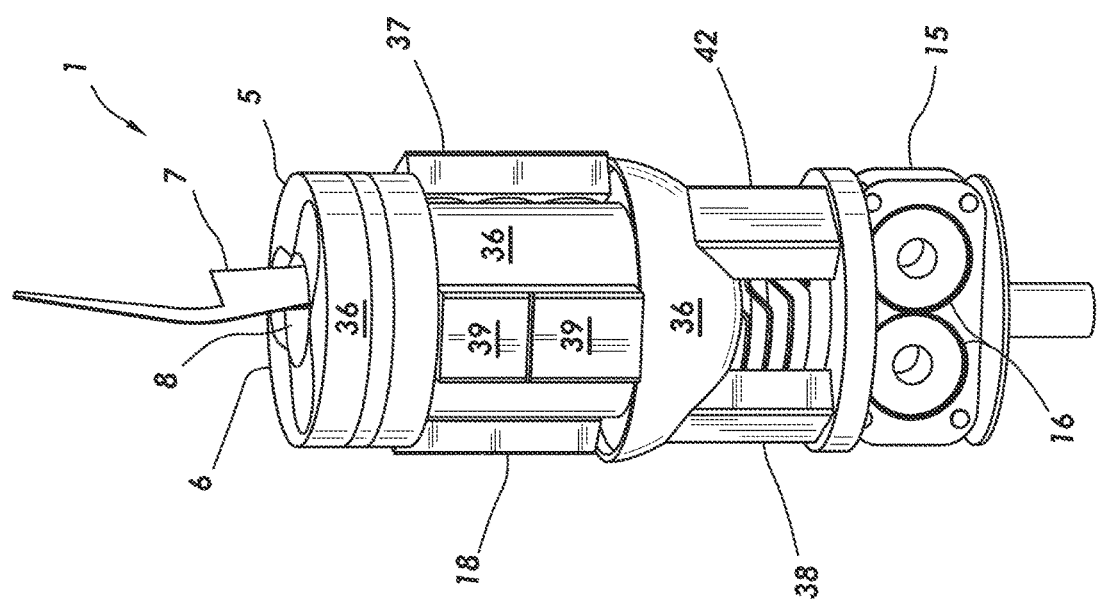
FIG. 1A shows a perspective view of an embodiment of the inventive technology, with housing, feedstock inlet componentry, furnace pre-stage, furnace and casting componentry.

FIG. 1B shows an embodiment of the inventive technology; it shows feedstock input componentry (5) that has both mechanical (e.g., driven roller balls (74) (covered by housing in FIG. 1A) and electromagnetic (electromagnetic induction drive) components, with each providing a portion of the feedstock input motive force. The electromagnetic portion may be of a furnace pre-stage (22)(such that input componentry and the furnace pre-stage (22) significantly "overlap" with respect to provision of input motive force, and may be said to be integral with one another). Such hybrid mechanical roller assisted electromagnetic system may also provide a solution to the challenges associated with feeding non-uniform ribbon feedstock. Indeed, FIG. 1B (and FIG. 3A) shows an example of a system that can potentially offer advantages in handling conductive feedstock that is of non-uniform cross-section (e.g., at one point along the length of a strip-type feedstock, there is one cross-sectional shape, and at a different point there is a different cross-sectional shape, or one strip has one cross-sectional shape and a different strip has a different cross-sectional shape), with variable cross-sectional areas.

More particularly as to certain embodiments of such hybrid (here, mechanical and electromagnetic) input feed componentry, such may feature a mechanical roller ball (74) feed mechanism to first guide, move and combine feedstock (non-uniform or otherwise) into the electromagnetic portion—e.g., an electromagnetic induction heat, drive (moving the metal downflow) and steer system that also acts as a furnace pre-stage (22)—that may include, e.g., ferrite core induction coils. Feed roller balls (74) may be motor-driven rotationally and perhaps controlled by machine vision sensor(s), at least in part, such that one or more feedstock (e.g., strips such as non-uniform ribbons) may be fed controllably into the furnace pre-stage (22) (as shown in FIG. 1B, a type of electromagnetic induction drive). In certain embodiments, the furnace pre-stage (22) may then combine feedstock together via melting.

Embodiments of the inventive technology may present the ability to feed variable geometries of strips that would not feed reliably with rollers and other mechanical means alone due to their odd shape (so electromagnetic input motive force generator(s) (19) may be used in conjunction with, or instead of, such mechanical input motive force generator (19)). Further, the inventive technology may provide a lifespan advantage over soft manipulators and other flexible roller methods as they contend with odd shapes.

Figure 8B:
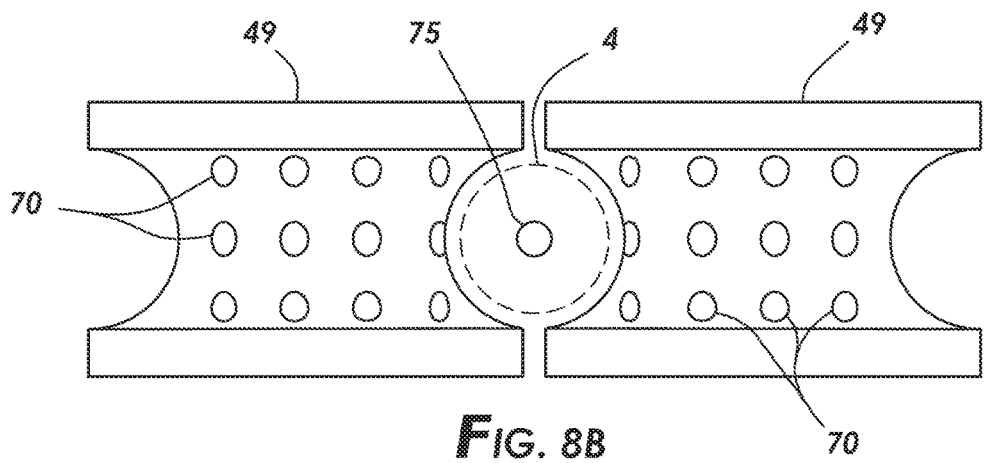
FIG. 8B shows a view, looking upflow from a downflow end of the apparatus, of a rotating die with embedded coils (that contactlessly reshapes melt into a circular second shape), as may appear in embodiments of the inventive technology.
Figure 8C:
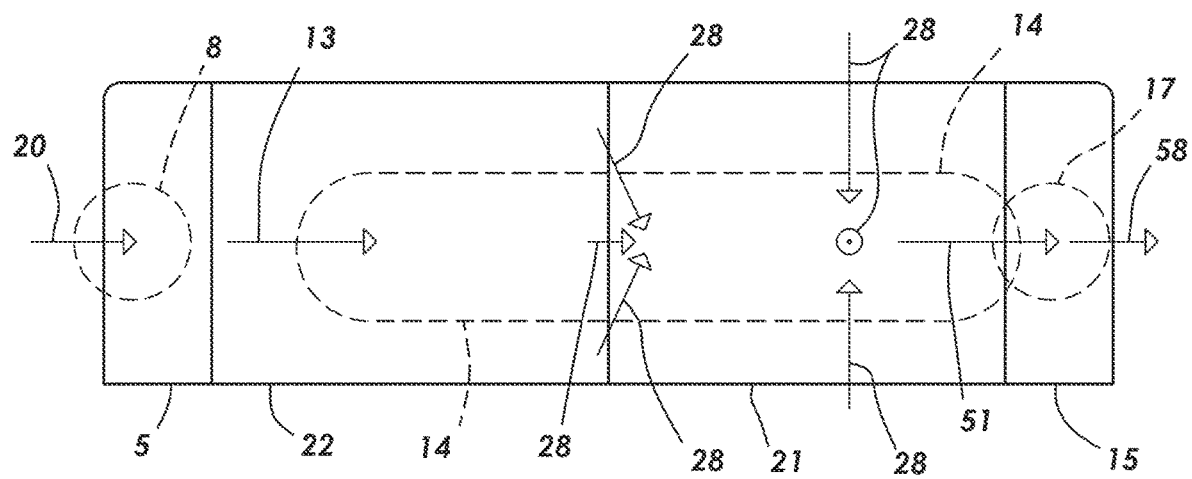
FIG. 8C conceptually shows various stages, sites and forces of a space debris processor that may appear in certain embodiments of the inventive technology (note that centering force between the two vertical arrows (each also labeled as (28)) is into (and out of) the paper.

As mentioned, certain embodiments may present contactless feedstock input componentry (5) that accepts (perhaps even feeds) the metal feedstock (7) into the apparatus without contacting it. Such may be of particular benefit with respect to Ti and other refractory metals. EMF generators (10) (e.g., induction coils, flux concentrated or not) that can achieve such contactless processing may also find application in heating and/or casting to render either or both of such processes contactless. Certain contactless processing componentry—e.g., for casting and/or as a contactless rotating surface type input motive force generator (19), or even potentially for heating and/or moving melt (12)—may feature coils embedded (embedded coils 70) into a surface of apparatus componentry that would otherwise contact the metal (e.g., embedded coils 70) and/or coil(s) externally of (perhaps even partially around) those apparatus surfaces that might otherwise contact the metal. FIG. 8B shows a contactless rotating wheel die (although such die, without embedded coil(s) and/or center pin is part of the inventive technology).

For, e.g., recycling applications, non-uniform feedstock (conductive feedstock input into the apparatus for processing) will typically be controllably fed into a heater. Hoppers and conveyor belts might not be adequate (at least not alone) for such applications of the inventive apparatus, in micro or zero gravity; such extraterrestrial environment (in which the inventive technology typically finds application) may require other means to controllably feed material, as disclosed herein.

The heater (9) could be a contained (e.g., housed) chamber(s), perhaps with an inlet and outlet. It typically either is (in its entirety), or includes, a furnace (21) (e.g., in addition to a furnace pre-stage (22) upflow of it). Heater componentry may or may not be enclosed (via housing (36)). The apparatus is typically always characterized as having a heater (9); it, in embodiments, may be generally described as the portion of the apparatus immediately upflow of any cast, that includes at least one EMF generator (10) and that, at some point during operation, contains melt (12) that is moved directly into casting componentry (15). The heater (9) may, in certain embodiments, include a furnace (21) and a furnace pre-stage (22) that may be disposed upstream of the furnace (21). Each may include one or more EMF generator(s) (10) (e.g., a furnace EMF generator and a furnace pre-stage EMF generator).

At least one electromagnetic field (EMF) generator may be disposed as part of the heater (9). Where there is a furnace pre-stage (22) and a furnace (21), at least one EMF generator (10) may be found in each the furnace pre-stage (22) and the furnace (21). In certain embodiments, the furnace may appear as a furnace tube (26). In certain embodiments, the EMF generator(s) (10) may be induction coil(s) (e.g., flux concentrated coil(s) (24) such as EMF director(s) that direct the field via core inside the coil (see, e.g., FIG. 1B), or not flux concentrated such as bare coils), antenna(ae), controllably moved magnets, and/or magnetron(s). Magnetrons—a type of EMF generator (10) that does not include coil(s), but vacuum tube(s)/resonant cavity(ies) instead—finding application in the inventive technology, may be as described in https:en.wikipedia.org/wiki/cavity_magnetron, incorporated herein in its entirety, as but one example, and include, e.g., microwave magnetrons.

Coil(s), e.g. induction coil(s), include but are not limited to any coils with multi-winding conductors in three dimensional space, multiple windings in 2D or 3D space, single or partial winding in 2D (substantially uniplanar) or 3D space, flux concentrated coils (e.g., with ferromagnetic materials, e.g., iron, cobalt, nickel, metals or alloys that include same, etc., as a core or otherwise) positioned so as to concentrate and perhaps direct the EMF generated by the coil), coil(s) that are not flux concentrated or do not have any ferromagnetic material inside or outside of them (e.g., bare coils), may find application in several embodiments of the inventive technology disclosed herein.

Any EMF generator (10) with a coil (even if such generator includes other components such as, e.g., a ferromagnetic core as in ferromagnetic core coil (27)) may be said to be a coil. More than one coil may be arrayed, e.g., in 2-D or 3-D, and controlled for manipulating the conductive feedstock/melt, although even one single coil, properly configured, may achieve the control as desired. In certain embodiments, the flux concentrating effect of a flux concentrated coil (24) may arise from ferromagnetic material (e.g., as a core) that can act to concentrate, and perhaps also increase, an EMF generated by the coil; a flux concentrated coil (24) can perhaps reduce power and/or number of windings/coils needed for generation of a certain EMF. Generally, a few of many possible core configurations include a simple "I" core (e.g., cylinder of ferromagnetic material as a core within a coil (ferromagnetic core coil (27)), "C" or "opposing C's" core. Note that certain coils, even flux concentrated coils, may configure ferromagnetic material(s) (e.g., via shape and position of such material(s) relative to the coil) to block an EMF generated by the coil (perhaps while also achieving other goal(s)). Further, an exemplary induction coil that uses ferromagnetic material to concentrate, guide (direct) and/or block EMF(s), may be as generally found in induction cooktop heating apparatus.

In certain embodiments, the heater (9) may be said to define a longitudinal axis that passes through the furnace (21) (and perhaps also any furnace pre-stage (22) that may exist). Each EMF generator (10) may, potentially, also define its own longitudinal axis (e.g., an EMF generator (10) longitudinal axis, as defined by any helix or circular shape of a coil of such generator), whether that generator be a flux concentrated coil (24) (e.g., with a core), or simply a "bare" coil (without ferromagnetic material). That EMF generator (10) (longitudinal) axis will often be the same as a coil (longitudinal) axis (e.g., axis of a helix); in certain embodiments, such coil(s) may be configured so that the axis of at least one of such coil(s) (perhaps there is even only one coil total in, e.g., the furnace (21) or any furnace pre-stage (22) that is upflow of it) is substantially co-linear with the heater longitudinal axis (30) (e.g., the heater (9) and its coil may be said to be co-axial). Such configuration may be particularly suited for furnace heating/agglomeration of a melt (12) (although it can certainly be used in other componentry of the apparatus). Note that a coil is said to define a helix even where winding(s) thereof exhibit a bend therein that seeks to make the winding "flatter" (and a winding or partial winding may be said to define a circle or part thereof even where such bend exists).

In certain embodiments, there may be one or more EMF generators (10) (e.g., in a furnace (21) and in any furnace pre-stage (22) that exists) that is/are configured so that their respective longitudinal axes intersect(s) (with the heater longitudinal axis (30)) at at least one point (32) on the heater longitudinal axis (30) (their axes are not parallel nor co-linear with the longitudinal axis of the heater (9)). The EMF generators (10) may form an array in trihedron, triangle, tetrahedron, square, pentahedron or pentagon shape (as but a few examples). The respective EMF generator (10) longitudinal axes (e.g., flux concentrated coil (24) longitudinal axes) may intersect with the heater longitudinal axis (30) at at least one point on the heater longitudinal axis (30); portions (33) of their respective longitudinal axes that are directed towards the heater longitudinal axis (30) (EMF generators (10) may be said to point inwardly) may, in certain embodiments, angle downflow or upflow, so as to perhaps better enable the controllable centering of metal in the heater (9) (in the furnace (21), and perhaps also in any furnace pre-stage (22) that exists), or enhance a drive force, as desired. Such configuration may enable EMF generators (10) (whether flux concentrated coils or otherwise) to achieve a comparatively high degree of control with respect to steering (e.g., FIG. 1B shows such configuration in a furnace pre-stage (22)), including centering.

Note that, as mentioned, any EMF generator (10) in the heater (9) (whether in the furnace (21) where there is no furnace pre-stage (22), or in the furnace pre-stage (22) where it exists) may even play a role (perhaps the only role in certain embodiments) in providing a feedstock input motive force. This is consistent with much of the apparatus' componentry, in various embodiments: a single componentry or system may achieve more than one function; there may be overlap with respect to a single functionality (e.g., two different componentry may help to achieve that function); there might not be clear delineation between various sites of the apparatus (as indeed certain of them may overlap one another); and the same "assembly" might be fairly characterized as two different componentry even where such are integrated with one another (e.g., EMF generators of furnace pre-stage (22) may act as input motive force componentry).

One example of an apparatus where substantially the entire input motive force (to move feedstock into the apparatus) is provided electromagnetically is where flux concentrated coil(s) (24) in the heater (9) (e.g., in a furnace pre-stage (22)) provide such motive force. It is of note generally that where fewer than all of a plurality of EMF generators (10) of the heater (9) is/are responsible for a certain function, then it is understood that the at least one EMF generator (10) still achieves such function.

Any furnace pre-stage (22) that exists could include at least one EMF generator (10), e.g., flux concentrated coil(s) (24) or even bare coil(s), as but two examples; such EMF generators (10) may achieve certain functions and/or act on the metal in certain ways, e.g.: assure the furnace (21) is properly charged with metal (e.g., enough to cast the melt (12)); combine solid metal into the melt by melting solid metal; combine melt from more than one piece of feedstock that is input into the metal at the same time; heat metal in the furnace pre-stage (22); melt metal in the furnace pre-stage (22); move metal through the furnace pre-stage (22); move metal to the melt site; move metal through the melt site; move melt to the furnace (21); move solid metal to the furnace (21); keep the melt in the furnace that is downflow of it (e.g., by preventing it from moving upflow, reversing out of the furnace (21)); control the speed at which metal is moved to the furnace (21) so that it sufficiently corresponds with the furnace temperature and perhaps even the casting componentry (15) (e.g., to facilitate proper melting, and to avoid backing up of material, or insufficiency of material, in the furnace (21) or casting componentry (15)); steer the melt (12) (controllably adjust the position of the melt in a plane that is orthogonal to the longitudinal axis of the heater (9)) in the furnace pre-stage (22) and/or furnace (21); steer the metal via a centering force (28) so that melt is centered in the heater (9) (along its longitudinal axis); steer the melt so that it does not contact the equipment and inner walls of the heater (9); steer the melt so that at least part of it is intentionally off-center (as may be required in certain casting applications); agglomerate melted metal (a melt) in the furnace (21); and/or perhaps provide at least a portion of the motive force that moves the metal into the furnace (21). Any one or more of such may facilitate proper functioning of a furnace and, as such, may, in certain embodiments, be characterized as a pre-stage functionality. Note that control of certain of such functionalities may be achieved via regulation, including changing over time, of frequency and/or amplitude of coil power, perhaps in addition to, e.g., sensor(s) and related control componentry that enable effective control and achievement of functional goals (e.g., speed of melt movement, intended rough shape of agglomeration, etc.)

A furnace pre-stage (22) may include EMF generators (10), such as, but not limited to, bare coil(s) (e.g., without any ferromagnetic material that might act to concentrate flux) and/or flux concentrated coil(s) (24), some of which may be core coil(s), where such core is typically ferromagnetic. Flux concentrated coil's in the heater (9) (e.g., in a heater pre-stage) may be arranged in, e.g., a layered or tiered array (e.g., a two, three or more layer configuration), and, as mentioned, may be "pointed" inwards (and even angled downflow and/or upflow); flux concentrated coil(s)' respective longitudinal axes (31) may intersect with the heater's longitudinal axis. Such is one example of a multi-flux concentrated coil array that is operable to melt, steer and/or move metal (perhaps in addition to achieving other function(s)); other configurations in the furnace pre-stage (22) are possible, including but not limited to those where the coil(s) longitudinal axis (35) is colinear with the furnace pre-stage (22) axis.

In certain embodiments, particularly where there is no mechanical feedstock input componentry (5) upstream of a furnace pre-stage (22) that may exist, the furnace pre-stage (22) may act as a major component (i.e., the input force generator) of the feedstock input componentry (5), perhaps in addition to an aperture through which feedstock is input. Again, even where there is such mechanical input force generator (e.g., including but not limited to three driven, rotating balls (74)), the heater (9) (furnace alone or furnace pre-stage (22) where there is one) may still provide a portion of the input motive force that moves feedstock into the apparatus, and thus may be said to act as an input force generator (as does, e.g., any mechanical input force generator where it exists). Where mechanical feedstock input componentry (5) merely guides (without also driving) feedstock during input (or generally where there is no input componentry upflow of the heater (9) that applies an input motive force), then EMF generator(s) that are part of the heater (9) that is immediately downflow of such componentry (e.g., furnace pre-stage (22) or furnace), may provide the input motive force in its entirety. As such, in certain embodiments, EMF generator(s) of the heater (9) or part(s) thereof (e.g., the furnace or furnace pre-stage (22)) may act as the sole input motive force generator (19).

Now referring to the furnace pre-stage (22) of FIG. 1B, and its three layered, 9 (nine) EMF generators (10) (flux concentrated coils): the magnetic forces generated by such coils want to repel the metal; the fields typically extend in some type of arc-like manner radially from each flux concentrated coil. Melt (12) moves to the region where the field minimum occurs. For flux concentrated coils configuration of FIG. 1B (as but one relevant figure), there may be a maximum field basically at the ends of the concentrators, with the field strength reducing as distance from the coil increases (in any direction). If all 9 coils were energized equally, one may observe two balls (perhaps of distorted shape) of melt stuck in the minimum formed between each layer of coils. Movement of melt can be achieved, in certain embodiments, by turning off one of the layer of coils (to create a newly located fields minimum to which the melt may move). Changes to energization, phasing, frequency adjustment, powering, amplitude, etc., of one or more coil(s) or layer(s) thereof, relative to others, can be used to create a new EMF minimum (e.g., that is slightly downflow of the immediately prior minimum), and thus a motive force (here, along the axis of the heater (9)) that moves that melt to that new "downflow" minimum). Repeated manipulation of fields (e.g., via energization, degree of powering, amplitudes and/or frequency of EMF generator (10)) can act to move the melt in a way that, in certain application, may be roughly analogized to peristalsis, at least conceptually.

In certain embodiments, the furnace may maintain the melt (12) (or melt metal if it is delivered to the furnace as solid metal), via its EMF generator(s) (10), and perhaps even mix the melt (via, e.g., the EMF generator(s) (10)), perhaps even without contact between apparatus componentry and the melt (12). Such mixing may result from electromagnetic fields acting on the melt, which perhaps serve also as an agglomerating force to agglomerate the melt. In the furnace, the melt may, in certain embodiments, be agglomerated, e.g., by electromagnetic field(s) generated by componentry in the furnace or in a furnace pre-stage (22); and perhaps even a narrowed shape, such as a throat, of or near the most downflow portion of the furnace (e.g., of the casting componentry (15)).

Figure 2B:
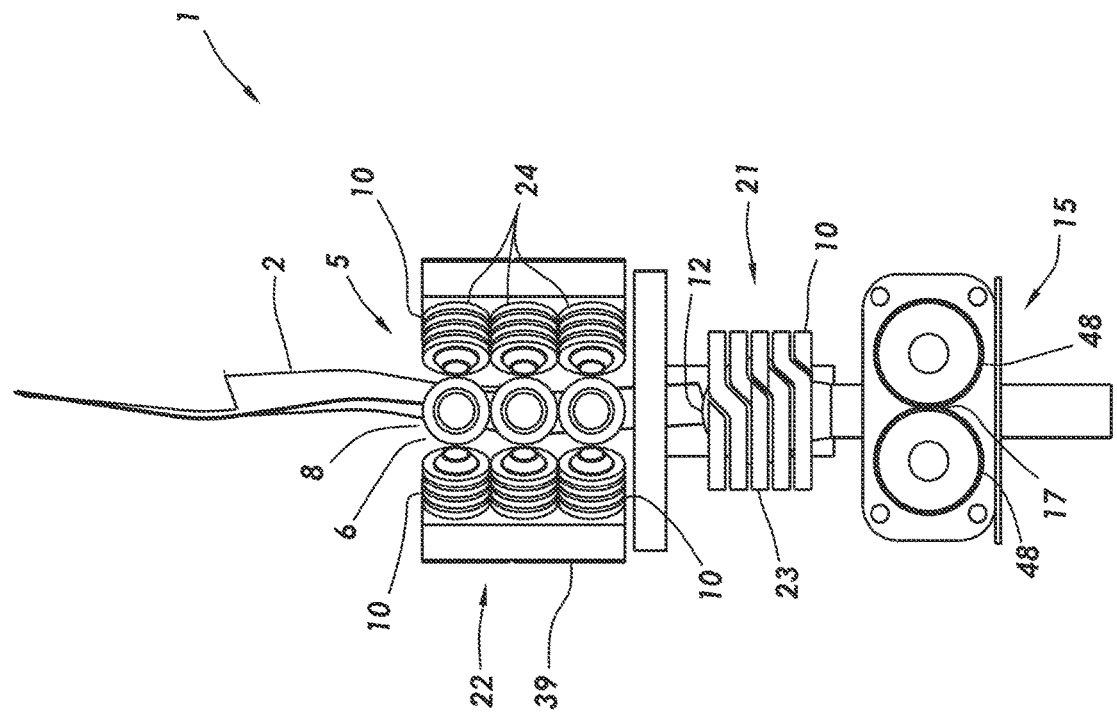
FIG. 2B shows a side view of an embodiment of the inventive technology (with furnace and furnace pre-stage, but no mechanical feedstock input componentry) without housing, with furnace pre-stage shown via (length-wise) cross-sectional cutaway (pentagon configuration, with two closest EMF generator columns not shown).
Figure 2A:
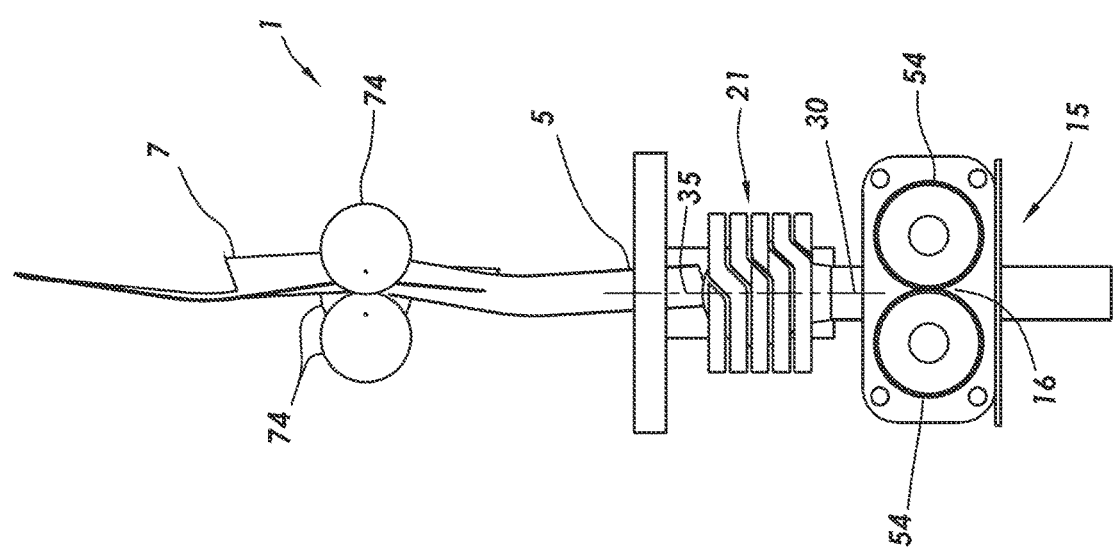
FIG. 2A shows a side view of an embodiment of the inventive technology (no furnace pre-stage), without housing.
Figure 3B:
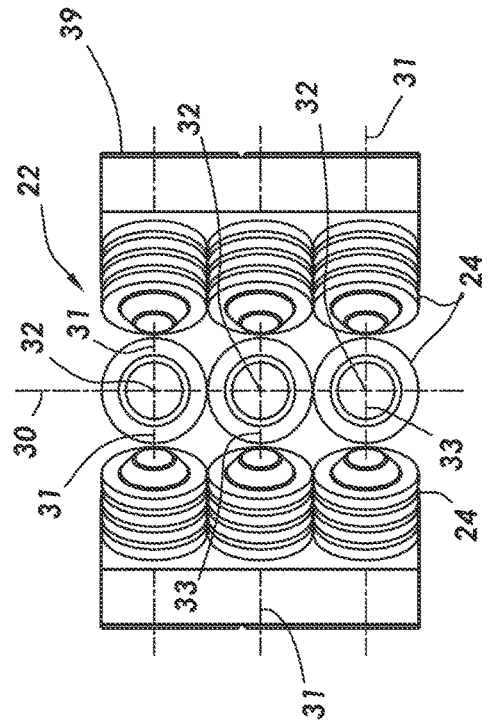
FIG. 3B shows a side view of an inventive furnace pre-stage shown via (length-wise) cross-sectional cutaway (pentagon configuration).
Figure 3C:
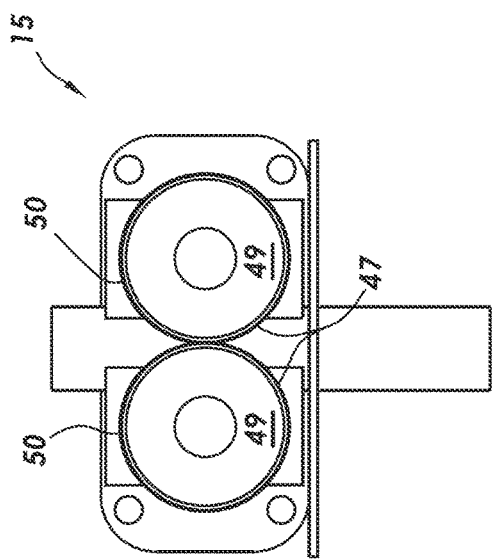
FIG. 3C shows a side view of casting componentry as may appear in certain embodiments of the inventive technology.
Figure 3A:
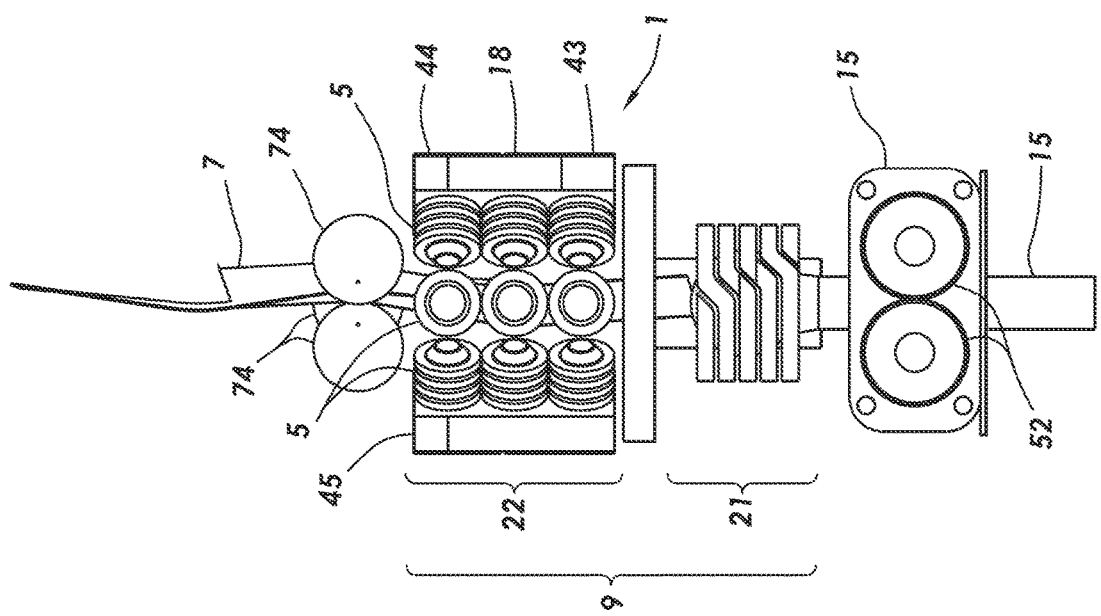
FIG. 3A shows a side view of an embodiment of the inventive technology (with mechanical feedstock input componentry, furnace pre-stage, furnace and casting componentry), without housing, with furnace pre-stage shown via (length-wise) cross-sectional cutaway.

Note that while certain figures (e.g., FIGS. 1B, 2B, 3A) show flux concentrated coil's in a furnace pre-stage (22) (with coil (longitudinal) axis (35) that intersect a heater axis), and a single bare coil (with coil axis (35) aligned with the furnace axis) in the furnace, any sort of EMF generator (10) could be used in heater (9). For example, instead of what is shown in FIGS. 1B, 2B and 3A, flux concentrated coil(s) (24) could be used exclusively in both the furnace pre-stage (22) and the furnace, bare coils could be used exclusively in the furnace pre-stage (22) and the furnace, bare coils could be used exclusively in the furnace pre-stage (22) and flux concentrated coil(s) (24) could be used exclusively in the furnace, both types of EMF generator (10) could be used in each the furnace pre-stage (22) and the furnace, or indeed even magnetrons or other types of EMF generator (10) could be used in the furnace pre-stage (22) and/or the furnace. And any of such EMF generators (10) could be oriented differently (e.g., flux concentrated coil(s) (24) whose axis(es) (31) are aligned with the heater axis (without solid material cores, to allow metal passage therethrough) and/or bare coil(s) whose axis(es) intersect with the heater axis). Of course, bare coils, instead of flux concentrated coils, whether of a furnace or furnace pre-stage, could be configured so that their axes are not collinear with that of the heater.

Electromagnetic feedstock input componentry (5), whether of hybrid feedstock input componentry (5) or input componentry that is purely electromagnetic, may, in certain embodiments, include multiple flux concentrated coils (e.g., EMF directors as shown in FIG. 1B) arranged in a perhaps 3-D geometry (e.g., triangle, as but one of many examples) that enhance and perhaps even maximize the field gradient range on the feedstock (e.g., ribbon). Current in the coils may be controlled (via intentionally altering, over time, the amplitude and/or frequency (e.g., phasing), perhaps individually), to provide a wide range of force gradients and motive force to drive metal feedstock (7) contactlessly (ignoring any contact effected by any mechanical feeder upflow that might also be a part of the feedstock input componentry (5)) into the apparatus and/or furnace.

Perhaps using machine vision, the ribbon and/or melt (12) may also be steered to ensure one or more of the following: the furnace is uniformly and properly "charged" (with melt); the melt is sufficiently centered in the beater (9) so as to keep the melt off equipment (e.g., EMF generator(s) (10), sensor(s), etc.) and any walls (e.g., of housing) of the heater that it might otherwise contact; the melt (including at least part of an agglomerated melt) is intentionally directed off-center; and/or the melt in the furnace is properly agglomerated so that it can be moved to and acted on by the casting componentry (15), so that melt can be drawn therefrom for casting. Steering may, at times, involve the substantial centering of the metal in the furnace, along its longitudinal axis (note that this does not necessarily mean that the melt is strung thin along the axis, but merely that the melt (12), particularly as agglomerated, is substantially centered around the furnace axis (in one application, the melt in the furnace may appear, roughly, as a football whose axis is aligned with the furnace axis). Note that it may be desired, with respect to certain casts and/or certain 3-D printing applications, to move melt into the cast (16) at a position that is off the (central) longitudinal axis of the furnace (e.g., its mass center is off-axis); such intentionally off-axis positioning may be achieved via steering functionality as provided by the EMF generator(s) (10). Note also that steering may be used to counter the force of micro-gravity, which can often act unpredictably to move the melt (12) off-axis (or generally out of a desired position/route). Sensors, e.g., vision sensor(s), or generally EM sensor(s) or wavelength sensor(s), can be used to achieve even real-time position control. Steering may be achieved by EMF generator(s) (10) in the heater, whether the furnace alone, a furnace pre-stage (22) alone or both (where a furnace pre-stage (22) exists).

Embodiments that feature purely electromagnetic drive systems (e.g., whether at input, in the heater, and/or at casting) that achieve contactless movement of metal may do so, e.g., with one or more electromagnetic generators, e.g., induction coils either embedded in the surface or established around (even partially) apparatus or inner surfaces thereof. Note that while, e.g., induction coils may achieve contactless processing (e.g., movement and heating/melting) in purely electromagnetic systems (in certain embodiments), surface embedded coils (e.g., surface embedded coils that may be referred to as die-coils) and/or coils that are established around (even partially) apparatus or inner surfaces thereof (with which contact is to be avoided) may be used to achieve contactless processing (e.g., input feeding and/or casting) in hybrid electromagnetic-mechanical systems (e.g., those that combine EMF generator(s) (10) and moving (e.g., rotating) surfaces as seen perhaps at input and/or casting). Moving surfaces that achieve contactless processing may involve the use of coil(s) embedded in such surfaces, or coils established around apparatus or surfaces thereof.

Purely electromagnetic, contactless movement of metal may be particularly beneficial for feeding non-uniform shapes that would not feed reliably with roller type feed mechanisms (as may be seen in recycling, or even other applications). By controlling the gradient on a plurality of induction coils arranged within a specific geometry around the vector of movement it is possible to drive (including feeding) and even steer (magnetic or non-magnetic) electrically conductive metal strips (e.g., ribbons), or melt (12)

thereof, controllably along an axis defined by the apparatus (and do so without contact between apparatus and the metal). The inventive technology's space application may benefit from minimal maintenance and long life, which may be achieved in certain embodiments via contactless forms of movement (traction results in wear which requires replacement of worn parts).

Particular embodiments of the inventive technology may include casting componentry (15) that itself comprises a cast (16) and that is configured to shape a melt (12) that is moved into it into solid metal of the second shape (4) at a casting site (17). That cast may be, e.g., a mold (46) (including but not limited to an investment mold (61)), a die (as in a continuous casting process), and/or an extrusion (another potentially continuous casting process). Casting componentry (15) may include one or more of the following: cast, casting process motive force generator (50), casted metal storage componentry, etc.

Casting componentry (15) can include componentry that generates a motive force that moves metal from the most upflow edge of the casting site (17)(casting site (17) include where reshaping into the desired second shape occurs, whether by, e.g., a mold(s) (46) and/or die(s)). That componentry may be a casting process motive force generator (50) configured to generate a casting process motive force (51) to move melted metal from the melt site (e.g., a downflow portion thereof) to the casting site (17) to and perhaps through the cast (16) (e.g., to move the melt into a mold (46), or through a die). That casting process motive force generator (50) may be electromagnetic in nature such as where it is an EMF generator (10) (whether forming part of the heater or not), or it may be mechanical, or it may be a combination of both (hybrid). In those casting process motive force generators (50) that are at least partially mechanical, the casting process motive force generator (50) may include at least two moving components (52) that move towards each other and downflow (e.g., outwardly) the apparatus (during its operation); such may feature two moving surfaces (e.g., (potentially opposing) rotating wheels (54), moving tread, that move towards each other). A purely mechanical motive force generator typically involves contact with the metal and is not electromagnetic. Certain hybrid systems may achieve contactless casting via, e.g., embedded coil cast(s) (59) such as moving die(s) (48) with embedded coil(s) (70), or as otherwise described herein.

Figure 5A:
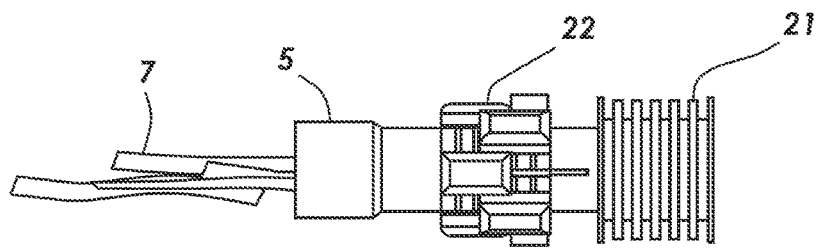
FIG. 5A shows a side view of an embodiment of the inventive technology (without casting componentry).
Figure 5B:
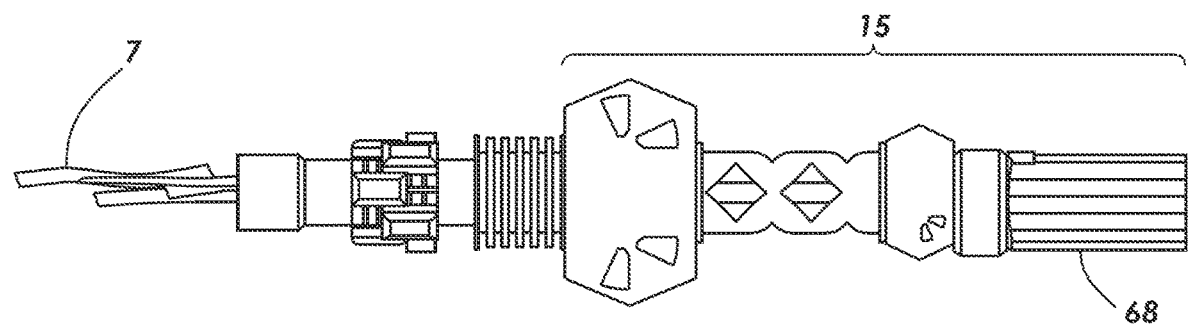
FIGS. 5B, 5C and 5D each show the embodiment of FIG. 5A interfaced with each of three different casting componentry.
Figure 5C:
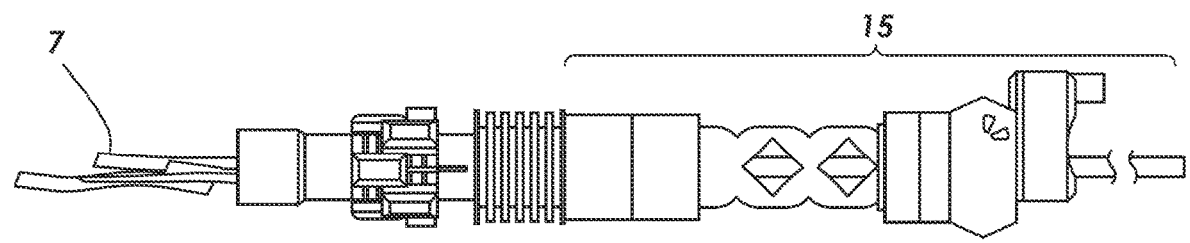
Figure 5D:
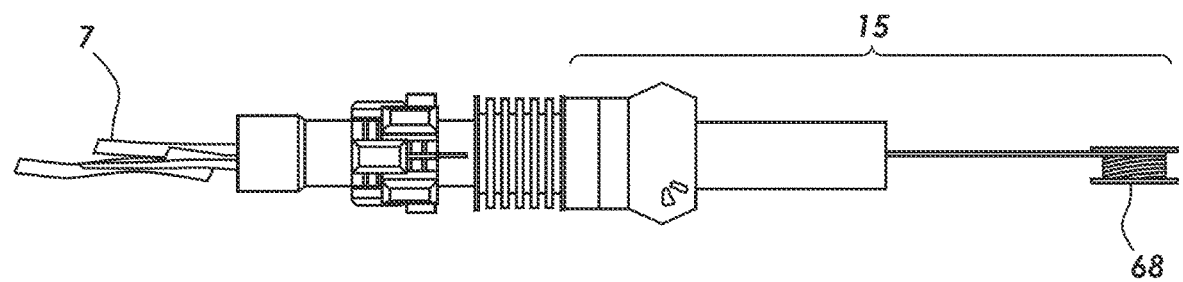

It is of note that particular embodiments of the inventive technology may be described as a wire maker as shown in, e.g., FIG. 5D (e.g., perhaps involving continuous casting via a moving die (48)) or a tube caster as shown in, e.g., FIG. 5C (perhaps involve a tube-shaped mold(s)). Certain embodiments may cast a Neumann Rod(s). In certain embodiments, including but not necessarily limited to embodiments featuring a die (47) or mold (46), the cast (16) may be provided with a pin, e.g., a center pin (75), that acts to impart a hollow longitudinal cylindrical space in the middle of the casted metal, perhaps generating a wire or tube with a hollow longitudinal center (in certain embodiments, such that the casted metal, at least conceptually, has the shape of a candle without a wick). In certain embodiments, the casted metal may be 3-D printable metal wire. In certain embodiments, the casted metal may be solid material fuel components, e.g., metal rods usable by pulsed plasma thrusters. FIGS. 5B-5D show various different casting componentry (15), each of which can be used to cast differently shaped metal, and each of which can be removed from the inlet componentry and heater (9) portion of the apparatus and replaced with different casting componentry (15) as required. In this sense, certain embodiments may be referred to as modular (modularity may also result from an analogous interchangeability of various feedstock input componentry).

Where the cast(s) (16) is a mold(s) (46), the casting process motive force generator (50) typically does not create the second shape as it may when the cast is a moving die (48) (although, with a mold, the mold may have such shape; the main purpose of the casting process motive force generator (50) in such embodiment(s) is merely to move the melt (12) into the mold (46), which itself creates the second shape). However, where the cast(s) is a die, then in certain of such embodiments, the casting process motive force generator (50) may be at least two moving components (52) (of a die that itself, as a unit, perhaps stays stationary relative to, e.g., the furnace) that move towards each other (and downflow the apparatus), and the cast (here, die), which does impart such second shape to the metal, may be said to be integrated with such force generator. The two may at least "overlap" in significant manner, and indeed may even be the same componentry, because the same componentry that moves the melt (12) into and out of the cast (e.g., moving surfaces) actually acts as the cast (in imparting the second shape to the metal via pressure between converging surfaces that "sandwich" the melt between them, after which that shaped metal is then moved from between such surfaces by those very same surfaces). In such embodiments, the die may be referred to as a moving die (48) (e.g., die that, as a unit is perhaps stationary relative to, e.g., the furnace, but that has moving surfaces) such as a rotating die (49), and the second shape may be imparted by the same moving (e.g., rotating) surfaces that act to move the melt through the cast. Such configuration is one way in which continuous casting (e.g., via continuous rolling out of a casted metal of a second shape) may be achieved.

A casting process motive force generator (50) may be configured to move the melt (12) into the cast (indeed, whether the cast (16) is die (47) or mold (46), the metal is typically a melt (as opposed to solid) when it enters the cast, although indeed an outer surface of the melt may have started to solidify). As mentioned, an exemplary mechanical type of casting process motive force generator (50) may be two driven, rotating surfaces (e.g., wheels (54)) (of course, there may be provided a motor and control componentry as needed to controllably move the surfaces). The melt moving into the cast (and perhaps even the cast itself) may be actively and intentionally cooled so as to achieve solidification of the melt when and/or where desired. In mold-type casting, the solidification may intentionally be controlled to occur in the mold (46) (such that the mold can first be filled with molten metal). Any cooling may, at least to an extent, result from a heat transfer that is at least partially controlled via, e.g.: intentional (e.g., that may be selected during design stage) positioning of componentry, including housing (36) and/or casting componentry; intentional relative positioning of componentry, and/or an inert gas (e.g., from a pressurized canister) configured to blow such gas on heated metal or heated components to cool metal via, e.g., forced convection and/or conduction). Any of such features may be used to increase and/or reduce as compared with what would otherwise be observed (generally control) the transfer of heat from the metal or heated apparatus components to the lower temperature of space.

In continuous, die type casting, however, the apparatus may, as mentioned, involve a cast (e.g., moving die (48)) that is integral with a casting process motive force generator (50) (e.g., at least two moving components that move towards each other and downflow the apparatus). Such continuous casting embodiments may be configured so that the melt (12) may begin to solidify as it reaches the point between the moving (e.g., rotating) components (e.g., wheels (54), or moving tread) that are closest (e.g., at their narrowest point). Parts of the melt that may solidify first include at least the outer surface, or areas thereof. Such part(s) of the die/casting process motive force generator (50) (e.g., surfaces of rotating wheels (54) that are closest to each other) may contact the metal and, when such parts exhibit the second shape (e.g., when viewed along the longitudinal axis of the heater), impart the second shape to the metal and expel that metal out of the die.

The solidifying metal, e.g., at least the outer surface of the melt (12) as it is being shaped in the narrowest part of the moving die/continuous cast may, when contacted by that portion of the cast, provide the traction to pull and throttle the molten metal upflow of that portion through the cast. In a terrestrial environment, in certain configurations, gravity would assist in the continuous casting process, but because extra-terrestrial environments may be micro- or no gravity, the only "natural" (i.e., not imposed by the apparatus itself) significant force imposed on the melt that may impact the casting process directly that must be addressed (in certain applications) may be surface tension, which makes the melt tend (or "want") to form a ball. Certain embodiments of the inventive technology must be configured—e.g., via shaping/relative positioning of moving die (48) surfaces, and intentional cooling—to gain enough traction from the die/casting process motive force generator (50) to overcome the surface tension force(s) on the melt upflow of the casting componentry so the melt (12) can be pulled through the cast (e.g., by the moving surfaces of the die/casting process motive force generator (50)), instead of having surface tension of the bulk melt that is immediately upflow of the casting componentry (15) snap the melt (12) as it is moved (perhaps conceptually "stretched") between that bulk and the casting componentry (15). Cooling-induced solidification of melt as desired (e.g., via radiation, forced convection and/or conduction between melt and apparatus componentry) at a certain point or site of the process, may be achieved, at least in part, by configuring (e.g., during design, manufacture and/or assembly) the apparatus, whether via: relative positioning of components (e.g., positioning of EMF generators relative to other componentry); containing heat and/or releasing heat (e.g., via use of housing (36)); forceably blowing gas such as inert gas onto componentry and/or metal, whether melt (12) or solid.

Certain embodiments may provide what may be characterized as an electromagnetic gate (e.g., possibly featuring an array of EMF generators (10)) that acts to keep the melt (12) inside the apparatus or components thereof, e.g., in the furnace, casting componentry (15) and/or furnace pre-stage (22), and that perhaps overcomes melt surface tension forces and provides some throttling to the casting process. EMF generators (10) may be used to, e.g., push, and perhaps simultaneously deform the melt into the casting componentry (15) (mechanical casting componentry (15) motive force generator(s) can be used to provide, e.g., a pulling force to assist in such movement).

Note that in certain embodiments, metal may be processed continuously such that, while, e.g., metal is being reshaped (via casting), additional metal is being fed into the apparatus for processing (e.g., melting and casting of the melt (12)). Certain other applications may exhibit what may be referred to as batch processing (and, during certain batch processing, the aforementioned simultaneous melting and reshaping might not even be observed), and a single batch of feedstock is processed (including solidified into a second shape) before a successive batch is fed into the apparatus. Either batch type or continuous processing may continue until a goal, e.g., input or output goal is met.

Any casts may be contactless, e.g., via coils embedded in cast surfaces, e.g., embedded coils (i.e., die coils, whether on a die (47) or mold (46)), or induction coil(s) established, e.g., externally (radially outwards) of the surface with which contact is to be avoided. In certain embodiments, the cast may be a contactless cast, e.g., an embedded cast or coil cast (e.g., mold with coil around at least part of it). Such, like motion coils, in certain embodiments, may be powered using time-variant current (which may be adjusted, e.g., via adjustment of amplitude and frequency, perhaps individually for each of one or more of the coils, for control of the metal as desired). And when a casting process motive force generator (50) is also contactless (e.g., via embedded coils), the entire casting process may be contactless. Contactless motion may be achieved, at least in part, electromagnetically, as may be found where coil(s) and/or flux concentrated coil(s) (24) generate the motive force that moves the melt (12) into the contactless cast. Of note is that embedded coils may be established as part of a casting process motive force generator (50) that has at least two moving components that move towards each other and downflow (e.g., outwardly) the apparatus; such a generator may also serve as a contactless cast.

Any of the processes indicated herein—melting, moving, centering, casting, agglomerating, etc.—can involve contact between the apparatus and the metal (whether solid or melt), or can be contactless. Advantages of contactless processing may relate mostly to avoidance of wear of apparatus componentry inherent in contact-type processing. As mentioned, certain embodiments may achieve contactless processing via, e.g., embedded coil(s). However, other EMFs generator configurations could be employed to generate EMF(s) as part of the continuous casting componentry (15) to provide contactless continuous casting. Essentially, in any configuration, an EMF, whether created by embedded coil(s) or other type of EMF generator (10) (e.g., established at least partially around a surface with which contact is to be prevented), may produce a barrier on the surface of the moving die surface so the metal doesn't come in direct contact with it.

Contactless processing particulars as may be seen in one embodiment may be as follows: an EMF generator(s) (10), e.g., embedded coil(s), may be configured to generate a force on the conductive feedstock proximate the embedded coil by the interaction of the die-field and the EMF induced in the conductive object (metal, solid or melt) by the die-field. The resulting die-fields may be a sinusoidal or other alternating (generally, time variant) three dimensional magnetic dipole or multipole field; when used as part of casting componentry, such fields may shape the conductive object into the desired shape, functioning essentially as an electromagnetic die, to keep the conductive object contained away from the internal surfaces (e.g., of the cast, etc.). Analogous processing can be seen with EMF generators (10) such as coils that, differently from embedded coils, are not embedded in the surface with which contact is to be avoided.

Certain embodiments may include a casted metal removal motive force generator (55) that is operable to generate a casted metal removal motive force (58) that removes the casted metal from the cast. In certain embodiments (e.g., where the cast (16) is a mold (46)), such casted metal removal motive force generator (55) may be, at least in part, a ramrod (56) and ramrod actuator (57) configured to move the ramrod so as to force casted metal out of the cast. In certain embodiments, e.g., where the cast is a moving die (48), the casted metal removal motive force generator (55) may be integral with the moving die. Indeed both such die and such force generator may be integral with the casting process moving force generator (which moves the melt (12) into the cast), such that certain componentry—a moving die (48)—achieves all three functions. Note also that casted metal implies sufficiently solidification to, e.g., maneuver the casted metal without unacceptably compromising it or changing its new (second) shape (additional solidification to achieve thorough solidification may take place after, e.g., the metal is moved to storage).

Note that various portions of the apparatus (e.g., the upflow, input end and/or the downflow end) can be interfaced with various other apparatus (e.g., a harvester at the upflow end (6), a casted metal collector at the downflow end, as but two examples). Further, such operatively connected componentry can potentially be interchangeable, e.g., it can be removed and switched out (e.g., robots can find application in various embodiments of the inventive technology, perhaps established in stationary position relative to the apparatus so the robot can act to, e.g., input feedstock into the apparatus and/or remove casted metal from the apparatus). A metal harvester may generate conductive feedstock from, e.g., "spent" space debris such as a spent satellite stage, used rocket stage, space junk, etc., as but a few examples of (conductive) metal space debris, and move that harvested metal to sufficiently near (perhaps even to or into) an input (e.g., an input aperture) of the apparatus (such that a conductive feedstock mover of the harvester can move that feedstock into the apparatus).

In certain embodiments, an additional apparatus may take casted output from the inventive apparatus (e.g., molded rods that are perhaps stored in the apparatus) and act on them in some fashion (e.g., move them into an additional, off-apparatus storage position). Casted output may be moved through an output (e.g., an output aperture) of the apparatus (in certain embodiments, such motion may be achieved by casting componentry (15); in others, it may be achieved by an additional apparatus that removes casted metal from the cast, or storage for casted metal (e.g., a casted metal collector). Componentry, perhaps automated such as but not limited to robotic componentry, may interface the downflow end of the apparatus so that it can remove continuously casted metal (e.g., rods), perhaps cutting or snapping it at various points once it has sufficiently cooled, and then placing such reduced-length casted metal into casted metal collector such as a metal rod collector (68), whether as part of the apparatus or exterior thereof.

In particular embodiments, casting componentry (15) may include an investment cast mechanism (60) that the cast(s) is a part of; whether part of such mechanism or not, a cast may be an investment mold (61). In these and certain other embodiments, casts may be established on a rotatable cast drum (62) that is controllably rotated by a motor (63) (and power and control componentry). Generally, where an apparatus features more than one mold (46), molds may generate casted metal having one shape (e.g., the second shape), or more than one shape such as including the second shape, a third shape, and perhaps even additional shapes. Whether as part of one or more of a multiple cast system and an investment cast mechanism (60), or not, casting componentry (15) may include a casted metal collector (64) which itself, in particular embodiments, may include a plurality of cartridges (65) (e.g., each for storing casted metal). Such cartridges may be established on a rotatable cartridge drum (66), powered by motor (67). Further, and similarly to other componentry, e.g., a heater (9) and/or feedstock input componentry (5), the casting componentry (15) may be single or multi-stage (two or more stages), perhaps with each additional stage appearing immediately downflow of the prior stage.

Embodiments of the inventive technology may feature power electronics componentry (18), e.g., one or more power electronics assembly(ies) (37), to power and possibly also control certain componentry, including but not limited to the EMF generator(s) (10). The term componentry as used herein does not necessarily require that component(s) thereof be together, e.g., contained in one or more assembly(ies), in a certain area, although certain embodiments may feature such configuration. Power electronic componentry in, e.g., the form of power electronics assembly(ies) (37) (including but not limited to housed unit(s)), may be provided to power (including, e.g., time variant current power where feasible) and control feedstock input componentry (5), the heater (9) generally, and/or casting componentry (15), in order to regulate, adjust, energize, de-energize, start, terminate, etc., any of the various functions they achieve (e.g., metal input, metal steering, heating, melting, metal moving, casting, agglomeration, cooling, solidification and/or agglomeration, as but a few possible examples of such functions). Such power electronics may be provided in various configurations (e.g., with one assembly controlling more than one of the feedstock input componentry (5), heater (9) and/or casting componentry (15); or with several assemblies achieving such control). A single assembly (e.g., contained in a unit(s)) may possibly be responsible for control of more than one componentry. In certain embodiments where more than one power electronics assembly is provided, each may possibly power and control a different system (perhaps a single power electronics assembly is dedicated to particular componentry, e.g., as where a furnace power electronics assembly (41), heater power electronics assembly (38), furnace pre-stage power electronics assembly (39), feedstock input power electronics assembly (40) and/or casting componentry power electronics assembly (42) is/are provided). Any power electronics assembly may be established internally of any heater housing, externally of any heater housing, extra-radially of EMF generator(s) (10), heater housing, etc.

Certain embodiments may feature a control method where at least one of the EMF generators (10) is electrically controlled individually (including independently of any other EMF generator(s) (10)) to achieve any change in or maintenance of performance such as in or of, e.g., metal motion, including speed and direction, melt steering, metal heating, metal holding (e.g., in position), melt agglomeration, melt mixing, motor speed, componentry speed (e.g., input roller ball speed and/or casting moving die speed), input control, casting speed, including achievement of any performance goal(s). In certain embodiments, more than 75% of all EMF generators (10), including all, whether they are part of the furnace, any furnace pre-stage (22), feedstock input componentry (5) and/or casting componentry (15), are individually controllable. Particular electrical parameters that may be controllably adjusted (including changed as desired) include but are not limited to: peak power, peak current, peak voltage, amplitude of current (peak or otherwise), frequency, voltage, current, etc. In certain embodiments, individual control of, e.g., a coil, may allow for control of one coil (or, more particularly, an electrical parameter of such coil) without affecting the same electrical parameter of a different coil (as such, individual control is independent). Such high degree of control can result in a high degree of precision in aspects of apparatus operation, e.g., melt movement and heating.

As with any control scheme, sensors can play a role, and control can be remote or autonomous. As with any control methodology, feedback, whether feedback data be generated by sensors or otherwise, can be employed to control performance as desired. Particular embodiments may involve control of frequencies (and possibly also amplitude) of one (or more) EMF generator (10) so as to achieve a desired phasing between that generator and at least one other (e.g., such that frequencies of two adjacent coils are intentionally phased relative to each other). Note that controllably adjusting of electrical parameters of EMF generators (10) that are not the same distance through the process flowpath (e.g., where one is immediately downflow than the other) can be particularly effective in achieving drive control, and controllably adjusting of electrical parameters of EMF generators (10) that are substantially the same distance through the process flowpath (e.g., where one is immediately downflow than the other) can be particularly effective in achieving steer control (however even the former can achieve steer control, and the latter drive control).

Individually controllably adjusting at least one of the respective electrical parameters of at least one of the plurality of the EMF generators (10) includes controllably adjusting an electrical parameter(s) (e.g., intentionally changing the frequency and/or amplitude) of each of such generator(s) without such adjustment effecting a change to the same electrical parameter (e.g., frequency and/or amplitude) of any of the other different generators. So, e.g., the frequency of one of the nine EMF generators (10) in the furnace pre-stage (22) of FIG. 1B can be adjusted without such adjustment causing a change in the frequency (or other electrical parameter) of any other of such 9 EMF generators (10) (and even without such adjustment causing a change in any parameter of the coil in the furnace of such figure). Another example: parameter(s) of EMF generator (10) #6 (of 9 of furnace pre-stage of, e.g., FIG. 2B) can be controllably adjusted, perhaps even at the same time parameter(s) of EMF generator (10) #7 are controllably adjusted, and neither of such adjustments will cause a change in any parameters of any other EMF generator (10) (e.g., the parameter adjustment of EMF generator (10) #6 won't cause changes in any parameters in any of EMF generator (10) #1-5 and #7-10, and the parameter adjustment of EMF generator (10) #7 won't cause changes in any parameters in any of EMF generator (10) #1-6 and #8-10). Note that individual control does not preclude an intentional individual adjustment of parameter(s) of each of two different EMF generators (10) such that those adjustments result in adjusted parameter(s) values of those two different EMF generators (10) that are substantially equal. Note that certain adjustments to frequency of one or more different EMF generators (10) may be made to achieve a desired phase shift between such two or more different EMF generators (10).

Control of any componentry may be autonomous (e.g., where the apparatus is self-controlled without instructions from a remote source (e.g., earth, space station, etc.)) or remote (i.e., controlled, at least in part, via instructions from a remote source). Where certain componentry is at least partially remote (e.g., power to the heater (9) is remote controlled but other aspects are autonomous), that componentry may be referred to as remote (or non-autonomous). Componentry may be configured for both remote and autonomous control (at separate times of course, as where during a certain time period control is remote, but during a different time period, control is autonomous); such may be still be referred to as remote componentry. Remote (or other) control may involve a receiver (43) and/or transmitter (44), inter alia. All componentry might be autonomous or all might be remote, or some might be autonomous and some remote.

Power electronics componentry (18) may include, e.g., sensors, amplitude modulator, battery(ies), power source, solar power componentry, frequency modulator, current modulator, voltage modulator, power modulator, etc., as but a few examples. Sensors may sense, e.g., any electromagnetic waves (of any wavelength), frequency, amplitude, wavelength, temperature, resistance, current, luminescence, voltage, any electronic/electric parameter, shape, orientation, position, rotational position, speed, acceleration, spin rate, mass, size, as but a few examples; such sensed parameters may be of the metal feedstock (7), the melt (12), the casted metal, the external environment, apparatus interior, the apparatus itself, etc. Sensors finding use in the instant inventive technology may include, but are not limited to, vision sensors, electronic eye(s), temperature sensor, electronic parameter sensor, position sensor, mass sensor, size sensor, speed sensor, shape sensor, orientation sensor, wavelength sensor, etc.

Of course, any controller (whether autonomous or remote) may, perhaps in response to any measured or sensed parameter, or a programmed protocol, adjust one or more features, parameters, or characteristics of a process or componentry achieving such process. Control may be real time, programmed, delayed control, dynamic control, reactive control, etc., perhaps as provided, at least in part, by a control processor(s) (45), which may include a logic controller. Any control may be dynamic (e.g., effecting change over time, such as changing field intensity over time, where time could be any unit of time). Controller(s) may provide for change to parameters of the EMFs by changing, e.g., the current amplitudes (possibly RF current) and/or frequencies in the coils, perhaps dynamically, perhaps in response to sensor readings (of certain condition(s), e.g., temperature, speed, luminescence). Controller(s) may provide for change of the parameters of the EMFs by changing, e.g., the (RF) current amplitudes and/or frequencies in the coils, perhaps of individual coils, perhaps in response to sensor readings (of certain condition(s), e.g., temperature, speed, position, EM waves and/or luminescence, etc.) Radio frequency (RF) is the oscillation rate of an alternating electric current or voltage or of a magnetic, electric or EMF or mechanical system in the frequency range from around 20 kHz to around 300 GHz.

There may be provided feedback componentry that enables adjustment of, e.g., a controllable parameter, such as melt EMF strength (e.g., by adjusting amplitude of power through a coil), so as to achieve a degree of compliance with a process performance goal (e.g., within a 15%, 10%, 5%, 2%, 1%, 0.5%, 0.1% window range (open or closed) centered on a target value or characteristic). A process performance goal may be, e.g., temperature, speed, temperature vs. position profile, melt color, metal orientation, melt shape, agglomeration of melt (12), metal composition (e.g., as with any melt refining), as but a few examples. A controller may be at least one logic controller (44), e.g., a programmable logic controller, such as may include a field programmable gate array. Of course, a controller(s) may play a role in the afore-described control of motion of melt as it moves through furnace, any furnace pre-stage (22) that exists, or perhaps other componentry (e.g., feedstock input and/or casting componentry (15)) by individually varying, e.g., amplitude and/or frequency of power through the coils of such componentry, which occurs independently of the same power parameters of other coils in the motion coil array.

A housing (36) (e.g., a covering, paneling, cylindrical paneling, etc.) may be provided for the entire apparatus, or only for certain of its componentry; in certain embodiments, a housing (9) may be established externally of the heater (9) (describing not only where housing is so established, but also where housing is additionally established externally of other componentry). The housing (9) may act to protect and/or provide environmental control to, e.g., input componentry, the heater (9), furnace pre-stage (22), furnace, casting componentry (15), and/or power electronics componentry (18). Housing (9) may provide benefits such as, e.g., protection, heat containment, temperature regulation, etc. Note that the apparatus or componentry thereof need not be enclosed for something to be deemed "within" or a part of it. Also of note is that, while the apparatus could be of virtually any size (in various cross-section, in length, etc.), certain embodiments could be from 0.25 m to 2.5 m; size may depend on the intended application(s) of the apparatus, e.g., the size of the harvested metal (input) and the casted metal (output).

The apparatus may be made of, e.g., ceramics, engineered ceramics, metal (including but not limited to stainless steel, Ti, copper, and Al, etc., and alloys thereof), composites, and assembled using, e.g., welds, adhesive, fasteners, etc. Manufacturing of the apparatus may include, e.g., extrusion, molding, die casting, welding, fastening, 3D printing, stamping, etc., in addition to any known or foreseeable manufacturing processes. Note that the entire apparatus, perhaps even when encased, may be established in a control chamber, e.g., a metal control chamber, to provide even more environmental control/protection.

With respect to overall processing goals, certain embodiments might not even seek to change cross-sectional shape of feedstock, but instead, perhaps with a goal of rejuvenating or recycling metal propellant fuel. For example, fuel rods consumed to small length (e.g., not dissimilarly from a burned down candle) can be fused together (via melting of end(s) thereof) to create reconfigured/rejuvenated fuel rods of usable length.

Certain embodiments may seek to merely melt and mix metal feedstock (7), without changing its shape in any manner, perhaps with the goal of, e.g., metal refinement, alloy composition homogenization, alloy generation (via melting and mixing of different metals), alloy or metal alteration, recycling and/or fuel rejuvenation. Two or more metals may be melted and mixed together to, e.g., create a melted alloy. Certain applications may involve melt refining (e.g., dross-like Al oxides separate from the melt (12) and could be skimmed off the melt).

Note that the terms element and componentry, where used in this disclosure, including its written description and figures, should be understood as referring to one component or structure, or more than one components or structures, whether physically connected or not. Further, this disclosure, where describing feature(s) of the invention in apparatus-oriented terminology, should be understood as also impliedly and inherently disclosing method or process steps relating to function(s) performed by such feature(s) either alone or in combination with other disclosed features, where such function(s) would be apparent to a person having ordinary skill in the art upon reviewing this disclosure.

Relatedly, explicit disclosure of a noun should be understood as implicit disclosure of the verb performed by that noun, and vice versa (for example, explicit disclosure of a "heater" effectively discloses, implicitly, "heating"; explicit disclosure of "heating" effectively discloses, implicitly, an "heater.") The figures in particular should be understood as impliedly and inherently disclosing relative positioning of features/componentry shown, where such relative positioning would be apparent to a person having ordinary skill in the art. Further, technical aspects of the invention that would be known to a person having ordinary skill in the art, having reviewed this disclosure, may not be described in explicit detail in the application as filed to avoid a tedious or prolix writeup. Accordingly, this disclosure should be understood as including such aspects, even where not explicitly disclosed.

This disclosure should be understood as providing a broad supporting description that supports even claims not explicitly appearing in the application as filed. For example, this application should be understood as providing support for the combination of any two or more features, components, parts, structures, or steps where such combination is not explicitly disclosed in the application as filed. Indeed, the application as filed is intended as providing support for any permutations and combinations of any two or more features, components, parts, structures, or steps explicitly disclosed therein. Individual aspects disclosed in the application as filed should be considered as independent inventions even where they are not explicitly indicated as such. Even where only one specific embodiment is disclosed, whether in exemplary fashion or not, in explicit or unspecified support of a broad invention description or claim, such description or claim should not be limited in scope to such specific embodiment. The application as filed should also be understood as supporting products produced by explicitly disclosed processes or methods; and processes or methods that manufacture explicitly disclosed apparatus.

Where terms of approximate equality such as "substantially" (e.g., "substantially equal to [reference value]") are used in this disclosure, unless explained differently herein, it should be understood that such terms include values within a closed-ended range of 5% of the indicated reference value, centered on that reference value. For example. "substantially equal to 100° C." would include from and including 97.5'C to and including 102.5° C. Note that not all uses of the term "substantially" or "substantial" are subject to this definition, as not all such terms are used to suggest sameness in some manner.

Any figures filed as part of this disclosure seek to show the invention or aspects thereof clearly and in uncluttered fashion. Accordingly, it is not necessarily the case that each of the figures of this disclosure shows every single component of the inventive technology or the aspect that it seeks to portray. It is also not necessarily the case that every single component shown on a figure is called out in that figure with a label given to that component in the written description. Further, components that appear identical in different figures may be called out with different numbers because one of such numbers is a label for a component that is a more general description than is the other number (for example, an identically appearing component can be an EMF generator (10) and a flux concentrated coil); it is also the case that such component, as appears in the two figures, may be a more general representation (e.g., perhaps a type of black box representation) that represents the two different components.

Further, to the extent any amendments, characterizations, or other assertions previously made (in or with respect to this or any related patent applications or patents, particularly in any parent, but also in any sibling or child application) with respect to any art. prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, particularly in any parent, but also in any sibling or child application, may need to be revisited. Accordingly, for example, if a broader claim or claim term is submitted in an application after an assertion (made in a different application) that prior art is different from a prior claim or claim term (of that different application), then, to the extent it might otherwise be construed as a disclaimer of subject matter, such assertion is rescinded and retracted (and such prior art may need to be revisited).

This disclosure should be construed as incorporating any and all disclosure indicated above, and indeed also below, in the following list, but only to the extent such disclosure does not contradict or is not inconsistent with the explicit (and related implicit) description (written and figures) of the application as filed.

LIST OF REFERENCES TO BE INCORPORATED INTO THIS DISCLOSURE

| Reference Identification | Reference Type | Date of Publication |
|---|---|---|
| U.S. Pat. No. 10,401,832 | US Patent | Sep. 3, 2019 |

What is claimed is:

1. An apparatus for melting and reshaping metal from a first shape into a second shape in a microgravity or zero gravity environment, comprising:
feedstock input componentry configured to accept conductive metal feedstock having said first shape into said apparatus at a metal input site, said feedstock input componentry comprising a mechanical input motive force generator configured to generate at least a portion of an input motive force that moves said conductive metal feedstock into said apparatus at said metal input site;
a heater established downflow of said feedstock input componentry, said heater comprising electromagnetic field generators and at least one inner wall, and configured to melt said conductive metal feedstock to generate a melt at a melt site located in said heater,
casting componentry configured to reshape said melt into said second shape at a casting site,
power electronics componentry configured to power said electromagnetic field generators with alternating current so that each of said electromagnetic field generators generates an alternating electromagnetic field;
wherein said electromagnetic field generators are configured and controlled so that said alternating electromagnetic fields effect at least a portion of a melt motive force that moves said melt through said melt site, and a steering force that prevents said melt from contacting said at least one inner wall of said heater during said movement of said melt through said melt site;
wherein said heater defines a heater longitudinal axis, each of said electromagnetic field generators defines a respective electromagnetic field generator longitudinal axis, and at least one of said electromagnetic field generators is configured so that its respective electromagnetic field generator longitudinal axis intersects said heater longitudinal axis at a point on said heater longitudinal axis, and
wherein said power electronics componentry enables individual control of said at least one of said electromagnetic field generators.

2. An apparatus as described in claim 1 wherein said at least one of said electromagnetic field generators is a flux concentrated coil.

3. An apparatus as described in claim 1 wherein said power electronics componentry enables individual adjustment of at least one of amplitude and frequency of said at least one of said electromagnetic field generators.

4. An apparatus as described in claim 1 wherein said casting componentry comprises at least two moving components that move towards each other and in a downflow direction.

5. An apparatus as described in claim 1 wherein said casting componentry comprises at least one cast.

6. An apparatus for melting and reshaping metal from a first shape into a second shape in a zero gravity environment, a microgravity environment, or an environment with acceleration due to gravity other than 9.8 m/sec$^2$, comprising:
feedstock input componentry configured to accept conductive metal feedstock having said first shape into said apparatus at a metal input site;
electromagnetic field generators established downflow of said feedstock input componentry and is configured to generate electromagnetic fields;
a heater configured to melt said conductive metal feedstock to generate a melt at a melt site, said heater comprising at least one inner wall;
casting componentry comprising at least one cast and configured to reshape said melt into said second shape at a casting site; and
power electronics componentry configured to power and control said electromagnetic field generators,
wherein said electromagnetic field generators are configured so that said electromagnetic fields move said melt through said melt site, and so that said electromagnetic fields prevent said melt from contacting said at least one inner wall of said heater during said movement of said melt through said melt site.

7. An apparatus as described in claim 6 wherein said heater comprises a furnace, and a furnace pre-stage established upflow of said furnace.

8. An apparatus as described in claim 6 wherein said heater defines a heater longitudinal axis.

9. An apparatus as described in claim 8 wherein said electromagnetic field generators comprise a plurality of flux concentrated coils, and each of said flux concentrated coils defines a respective flux concentrated coil longitudinal axis.

10. An apparatus as described in claim 9 wherein at least some of said plurality of said flux concentrated coils are configured so that said respective flux concentrated coil longitudinal axes intersect with said heater longitudinal axis at an upflow or downflow angle with said heater longitudinal axis.

11. An apparatus as described in claim 8 wherein said electromagnetic field generators comprise at least one coil, and each of said at least one coil defines a respective coil longitudinal axis.

12. An apparatus as described in claim 11 wherein said at least one coil is configured so that said respective coil longitudinal axis is substantially co-linear with said heater longitudinal axis.

13. An apparatus as described in claim 6 wherein said power electronics componentry enables individual control of at least one of said electromagnetic field generators.

14. An apparatus as described in claim 13 wherein said power electronics componentry enables individual adjustment of at least one of amplitude and frequency of said at least one of said electromagnetic field generators.

15. An apparatus as described in claim 6 wherein said at least one cast comprises a mold.

16. An apparatus as described in claim 6 wherein said at least one cast comprises a die.

17. An apparatus as described in claim 16 wherein said die comprises a moving die.

18. An apparatus as described in claim 6 wherein said casting componentry is configured to solidify said melt into said second shape at a casting site.

19. An apparatus as described in claim 6 wherein said casting componentry further comprises a casting process motive force generator configured to generate a casting process motive force to cast said melt.

20. An apparatus as described in claim 19 wherein said casting process motive force generator comprises at least two moving components that move towards each other and in a downflow direction.

21. An apparatus as described in claim 20 wherein said at least two moving components are of a moving die.

22. An apparatus as described in claim 19 wherein said casting process motive force generator is electromagnetic, at least in part.

23. An apparatus as described in claim 22 wherein said casting process is contactless.

24. An apparatus as described in claim 1 wherein said at least one of said electromagnetic field generators is configured so that its respective electromagnetic field generator longitudinal axis intersects said heater longitudinal axis at a point on said heater longitudinal axis and at an upflow or downflow angle with said heater longitudinal axis.

25. An apparatus as described in claim 6 wherein said melt has a melt cross-sectional size, and said at least one inner wall of said heater surrounds said melt when said melt is in said melt site, and said at least one inner wall is cross-sectionally larger than said melt cross-sectional size.

26. An apparatus as described in claim 6 wherein said at least one inner wall of said heater is circular in cross-section.

27. An apparatus as described in claim 6 wherein said electromagnetic fields provide all of a heat that melts said conductive metal feedstock at said melt site.

28. An apparatus as described in claim 6 wherein at least one of said electromagnetic field generators is part of said heater.

29. An apparatus as described in claim 6 wherein said power electronics componentry is configured to power and control said electromagnetic field generators with alternating current so that each of said electromagnetic fields is an alternating electromagnetic field.

30. An apparatus as described in claim 6 wherein said electromagnetic field generators are positioned and controlled so that said electromagnetic fields move said melt through said melt site, and so that said electromagnetic fields prevent said melt from contacting said at least one inner wall of said heater during said movement of said melt through said melt site.

31. An apparatus as described in claim 6 wherein said electromagnetic field generators are configured so that each of said electromagnetic fields effects a portion of a melt motive force that moves said melt through said melt site.

32. An apparatus as described in claim 6 wherein said electromagnetic field generators are configured so that each of said electromagnetic fields effects a portion of a steering force that prevents said melt from contacting said at least one inner wall of said heater during said movement of said melt through said melt site.

\* \* \* \* \*